(12) United States Patent
Yamaguchi

(10) Patent No.: US 7,248,260 B2
(45) Date of Patent: Jul. 24, 2007

(54) IMAGE GENERATION SYSTEM, PROGRAM, INFORMATION STORAGE MEDIUM AND IMAGE GENERATION METHOD

(75) Inventor: Kentaro Yamaguchi, Yokohama (JP)

(73) Assignee: Namco Bandai Games, Ltd., Tokyo (JP)

( * ) Notice: Subject to any disclaimer, the term of this patent is extended or adjusted under 35 U.S.C. 154(b) by 598 days.

(21) Appl. No.: 10/419,869

(22) Filed: Apr. 22, 2003

(65) Prior Publication Data
US 2003/0228052 A1 Dec. 11, 2003

(30) Foreign Application Priority Data
Apr. 26, 2002 (JP) ............... 2002-127033

(51) Int. Cl.
*G06T 15/00* (2006.01)
(52) U.S. Cl. .................. 345/426; 345/419; 345/561
(58) Field of Classification Search ................ 345/419, 345/422, 426, 561, 629
See application file for complete search history.

(56) References Cited

U.S. PATENT DOCUMENTS

| | | | |
|---|---|---|---|
| 5,724,561 A * | 3/1998 | Tarolli et al. ............. 345/561 |
| 6,064,392 A * | 5/2000 | Rohner ..................... 345/426 |
| 6,184,891 B1 * | 2/2001 | Blinn ........................ 345/426 |
| 6,686,915 B2 * | 2/2004 | Andrews .................. 345/422 |
| 6,762,760 B2 * | 7/2004 | Deering .................... 345/426 |
| 6,940,504 B1 * | 9/2005 | Mech et al. .............. 345/419 |
| 7,046,243 B1 * | 5/2006 | Mech ........................ 345/426 |

OTHER PUBLICATIONS

Lokovic et al., Deep Shadow Map, Aug. 2000, SIGGRAPH 2000, ACM, pp. 385-392.*
Heidrich et al., Application of Pixel textures in Visualization and Realistic Image Synthesis, Jun. 1999, Symposium on Interactive 3D graphics, ACM, pp. 127-134.*
Kreeger et al., Mixing Translucent polygons with vols. Feb. 1999, IEEE Visualization Publication, pp. 191-198.*
Heidrich et al., Applications of Pixel Textures in Visualization and Realistic Image Synthesis, ACM, Interactive 3D Graphics, 1999, pp. 1-9.*

* cited by examiner

*Primary Examiner*—Phu K. Nguyen
(74) *Attorney, Agent, or Firm*—Oliff & Berridge, PLC

(57) ABSTRACT

An α-value αP1 corresponding to a Z-value of each pixel in an original image and an α-nonuniformity setting α-value a UP which is a nonuniform α-value in a virtual plane are synthesized into an α-value αP2. The color ICP of the original image and the fog color CP are synthesized into a fog image, based on the α-value αP2. A plurality of α-nonuniformity setting α-values provided for the virtual planes different in nonuniformity pattern are synthesized. The nonuniformity patterns are changed depending on the virtual camera information and time information. An α-value used to synthesize the α-nonuniformity setting α-values is set based on a Z-value of each pixel in the original image. A Z-value of each pixel in the original image is used as an index number of a lookup table and the index color texture mapping is applied to a virtual object to convert the Z-value into an α-value.

10 Claims, 27 Drawing Sheets

IMAGE GENERATION SYSTEM, PROGRAM, INFORMATION STORAGE MEDIUM AND IMAGE GENERATION METHOD

Japanese patent application 2002-127033, filed on Apr. 26, 2002, is hereby incorporated by reference in its entirety.

BACKGROUND OF THE INVENTION

The present invention relates to an image generation system, a program, an information storage medium and an image generation method.

In the prior art, there is known an image generation system (or game system) for generating an image visible from a virtual camera (or a given viewpoint) in an object space which is a virtual three-dimensional space. It is highly popular as a method by which a so-called virtual reality can be experienced. If an image generation system which can play a role playing game (RPG) is considered herein as an example, a player can enjoy the game by controlling a character (or object) who is its own duplicate such that it moves on a map in the object space to fight against an enemy character, to dialogue any other character or to visit various towns.

Such an image generation system may be required to display a game scene covered with fog, mist, smoke, dust or the like which will generically be referred to "fog" later. To improve the player's feel of virtual reality, it is desired that the nonuniformity of the fog can realistically be represented.

One technique for representing such nonuniformity in the fog may be to use a billboard of translucent polygon. In this technique, a plurality of translucent polygons on each of which a nonuniformity pattern in the fog is mapped are provided. These translucent polygons are arranged directly facing a virtual camera in the direction of depth.

However, this technique generates an unnatural image since intersection lines between the translucent polygons used to represent the fog and the other polygons are visible.

BRIEF SUMMARY OF THE INVENTION

According to a first aspect of the present invention, there is provided an image generation system which generates an image visible from a virtual camera in an object space, the image generation system comprising:

an alpha-value synthesis section which synthesizes a first alpha value and an alpha-nonuniformity setting alpha-value into a second alpha value, the first alpha value corresponding to a Z-value of each pixel in an original image, and the alpha-nonuniformity setting alpha-value of each pixel being nonuniform in a virtual plane; and a color synthesis section which synthesizes a color of each pixel in the original image and a given color, based on the second alpha value.

According to a second aspect of the present invention, there is provided an image generation system which generates an image visible from a virtual camera in an object space, the image generation system comprising:

an alpha-value synthesis section which synthesizes a first alpha value and an alpha-nonuniformity setting alpha-value into a second alpha value, the alpha-nonuniformity setting alpha-value of each pixel being nonuniform in a virtual plane; and an image generating section which performs image generation processing based on the second alpha value, wherein the alpha-value synthesis section synthesizes a plurality of alpha-nonuniformity setting alpha-values provided for a plurality of virtual planes into the alpha-nonuniformity setting alpha-value to be synthesized with the first alpha value, the plurality of alpha-nonuniformity setting alpha-values being different in nonuniformity pattern.

According to a third aspect of the present invention, there is provided an image generation system which generates an image visible from a virtual camera in an object space, the image generation system comprising:

an alpha-value synthesis section which synthesizes a first alpha value and an alpha-nonuniformity setting alpha-value into a second alpha value, the alpha-nonuniformity setting alpha-value of each pixel being nonuniform in a virtual plane; and an image generating section which performs image generation processing based on the second alpha value, wherein the alpha-value synthesis section changes a nonuniformity pattern in the virtual plane corresponding to the alpha-nonuniformity setting alpha-value, based on at least one of virtual camera information and time information.

According to a fourth aspect of the present invention, there is provided an image generation system which generates an image visible from a virtual camera in an object space, the image generation system comprising:

an alpha-value synthesis section which synthesizes a first alpha value and an alpha-nonuniformity setting alpha-value into a second alpha value, the alpha-nonuniformity setting alpha-value of each pixel being nonuniform in a virtual plane; and an image generating section which performs image generation processing based on the second alpha value, wherein the alpha-value synthesis section sets an alpha-value used to synthesize the alpha-nonuniformity setting alpha-values, based on a Z-value of each pixel in an original image.

DETAILED DESCRIPTION OF THE EMBODIMENT

Figure 1:
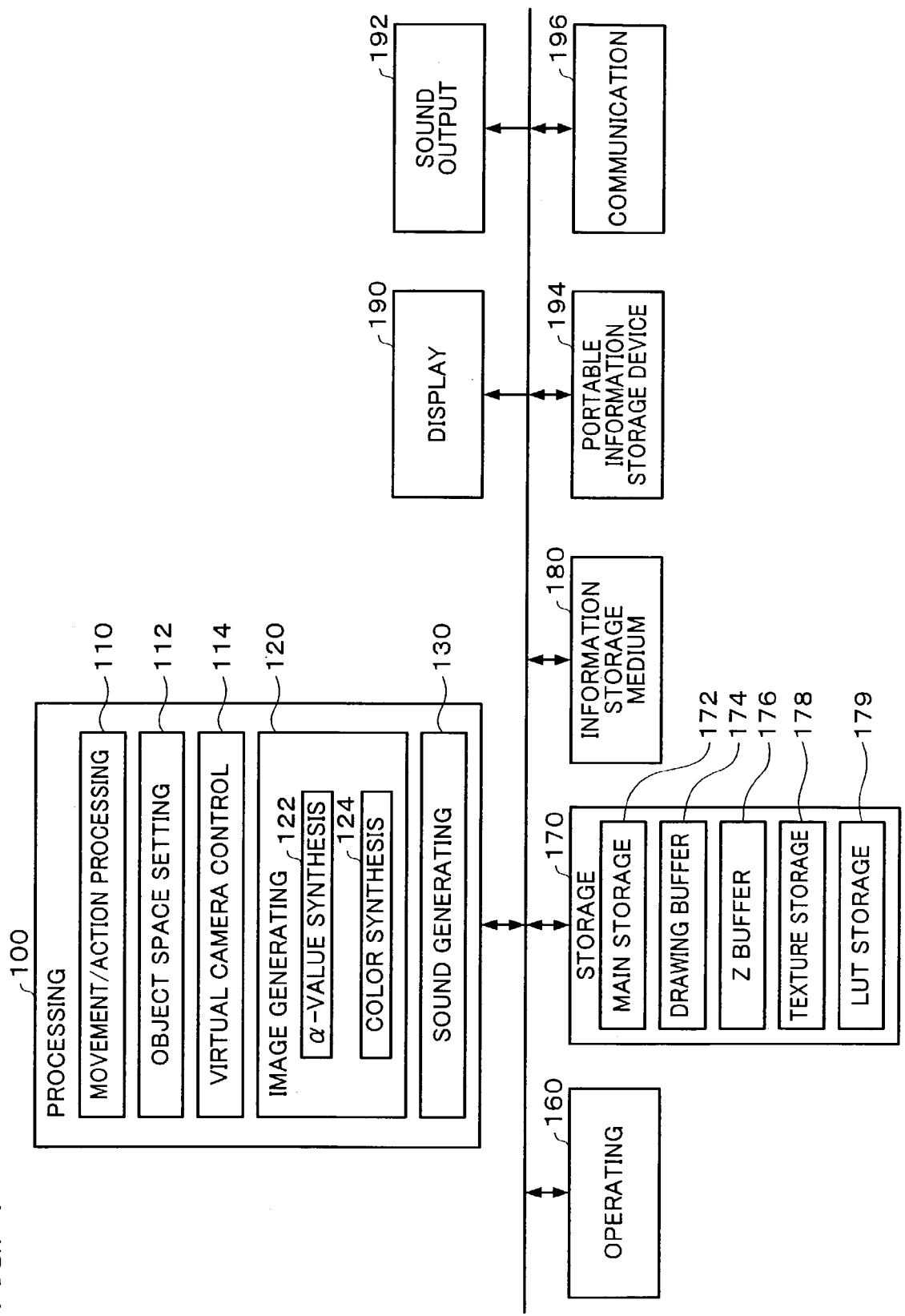
FIG. 1 is a functional block diagram of an image generation system according to one embodiment of the present invention.

Embodiments of the present invention will be described.

Note that the embodiments described below do not in any way limit the scope of the invention laid out in the claims herein. In addition, all elements of the embodiments described below should not be taken as essential requirements of the present invention.

According to one embodiment of the present invention, there is provided an image generation system which generates an image visible from a virtual camera in an object space, the image generation system comprising:

an alpha-value synthesis section which synthesizes a first alpha value and an alpha-nonuniformity setting alpha-value into a second alpha value, the first alpha value corresponding to a Z-value of each pixel in an original image, and the alpha-nonuniformity setting alpha-value of each pixel being nonuniform in a virtual plane; and a color synthesis section which synthesizes a color of each pixel in the original image and a given color, based on the second alpha value.

In this embodiment, the first alpha-value corresponding to the Z-value (or depth value) of the original image and the alpha-nonuniformity setting alpha-value are synthesized into the second alpha-value which is in turn used to synthesize the color of the original image and a given color (e.g., fog color). Thus, an image effect in which both the Z-value of the original image and alpha-nonuniformity (nonuniformity pattern) are added can be given to the original image. As a result, a realistic and natural image can be generated.

The Z-value of the original image may be used as an index number of a lookup table for index color texture mapping (i.e., by using the Z-value as an index number), and index color texture mapping may be applied to a virtual object using the lookup table so that the Z-value of the original image can be converted into the first alpha-value.

In this embodiment, the color synthesis section can be omitted.

In the image generation system, program, information storage medium and image generation method according to this embodiment of the present invention, the alpha-value synthesis section may synthesize a plurality of alpha-nonuniformity setting alpha-values provided for a plurality of virtual planes into the alpha-nonuniformity setting alpha-value to be synthesized with the first alpha value, the plurality of alpha-nonuniformity setting alpha-values being different in nonuniformity pattern.

In such a case, a virtual distance from a virtual camera to each of the virtual planes respectively corresponding to the alpha-nonuniformity setting alpha-values is provided. Based on the virtual distances, alpha-values used to synthesize the alpha-nonuniformity setting alpha-values or nonuniformity patterns in the virtual planes for the alpha-nonuniformity setting alpha-values can be controlled.

In the image generation system, program, information storage medium and image generation method according to this embodiment of the present invention, the alpha-value synthesis section may reduce a synthesis rate of an alpha-nonuniformity setting alpha-value for the nearest virtual plane among the plurality of virtual planes when a virtual distance from the virtual camera to the nearest virtual plane is shorter than a given distance; and the alpha-value synthesis section may reduce a synthesis rate of an alpha-nonuniformity setting alpha-value for the farthest virtual plane among the plurality of virtual planes when a virtual distance from the virtual camera to the farthest virtual plane is larger than a given distance.

After the synthesis rate of the alpha-nonuniformity setting alpha-value corresponding to the nearest virtual plane has been reduced (or made to zero), a new virtual plane may further be provided behind the farthest virtual plane. After the synthesis rate of the alpha-nonuniformity setting alpha-value corresponding to the farthest virtual plane has been reduced (or made to zero), a new virtual plane may further be provided at a position nearer to the virtual camera than the nearest virtual plane.

In the image generation system, program, information storage medium and image generation method according to this embodiment, the alpha-value synthesis section may change a nonuniformity pattern in the virtual plane corresponding to the alpha-nonuniformity setting alpha-value, based on at least one of virtual camera information and time information.

Thus, the nonuniformity pattern can be variously changed to generate a more realistic image, depending on the movement of the virtual camera or the passage of time.

In this case, the nonuniformity patterns in the virtual planes for the plural alpha-nonuniformity setting alpha-values may be changed, or the nonuniformity pattern for the alpha-nonuniformity setting alpha-value (to be synthesized with the first alpha-value) provided by synthesizing plural alpha-nonuniformity setting alpha-values may be changed.

In the image generation system, program, information storage medium and image generation method according to this embodiment, the alpha-value synthesis section may enlarge a nonuniformity pattern of the alpha-nonuniformity setting alpha-value in the virtual plane when a virtual distance from the virtual camera to the virtual plane decreases.

In the image generation system, program, information storage medium and image generation method according to this embodiment, when the virtual camera moves in a first direction which is parallel to a screen, the alpha-value synthesis section may move a nonuniformity pattern of the alpha-nonuniformity setting alpha-value in the virtual plane in a second direction which is opposite to the first direction.

In such a case, the distance of movement of the nonuniformity pattern of the alpha-nonuniformity setting alpha-value may be changed depending on the virtual distance from virtual camera.

In the image generation system, program, information storage medium and image generation method according to this embodiment, the alpha-value synthesis section may apply nonuniformity pattern texture mapping to a virtual object to generate the alpha-nonuniformity setting alpha-value, and change texture coordinates of the virtual object depending on at least one of the virtual camera information and the time information.

This makes it possible to change the nonuniformity pattern in a simplified manner.

In the image generation system, program, information storage medium and image generation method according to this embodiment, the alpha-value synthesis section may set an alpha-value used to synthesize the plurality of alpha-nonuniformity setting alpha-values, based on a Z-value of each pixel in the original image.

This enables an alpha-value used to synthesize the alpha-nonuniformity setting alpha-values may be set in consideration of the Z-value of the original image.

In the image generation system, program, information storage medium and image generation method according to this embodiment, when comparison of Z-values of pixels in the original image and a virtual Z-value of the virtual plane corresponding to the alpha-nonuniformity setting alpha-value to be synthesized with the first alpha value indicates that the pixels in the original image are nearer to the virtual camera than the virtual plane, the alpha-value synthesis section may set an alpha value used to synthesize the plurality of alpha-nonuniformity setting alpha-values into an alpha value which invalidates synthesis of the alpha-non-uninformity setting alpha-values.

When the pixel in the original image is farther from the virtual camera than the virtual plane by a given distance (or a distance shown by a Z-value), an alpha-value used to synthesize the alpha-nonuniformity setting alpha-values can be preferably increased.

In the image generation system, program, information storage medium and image generation method according to this embodiment, the alpha-value synthesis section may use a Z-value of each pixel in the original image as an index number of a lookup table for index color texture mapping and apply index color texture mapping to a virtual object using the lookup table so that the Z-value is converted into an alpha value used to synthesize the plurality of alpha-nonuniformity setting alpha-values.

This makes it possible to convert the Z-value of the original image into the alpha-value used to synthesize the alpha-nonuniformity setting alpha-value with a reduced processing load.

This embodiment of the invention will be described in details with reference to the drawing.

1. Configuration

FIG. 1 shows a functional block diagram of an image generation system (or game system) according to this embodiment. In FIG. 1, this embodiment may comprise at least a processing section 100 (or a storage section 170 in addition to the processing section 100), the remaining sections (or functional blocks) being configured by any components.

A operating section 160 receives control data from a player, its function being able to be implemented by hardware such as a lever, a button, a steering wheel, a shift lever, an accelerator pedal, a brake pedal, a microphone, a sensor or a housing.

A storage section 170 provides a work area for the processing section 100 and a communication section 196, its function being able to be implemented by hardware such as RAM.

An information storage medium (or computer-readable medium) 180 stores programs and data, its function being able to be implemented by hardware such as a laser disk (such as CD or DVD), a magneto-optical disk (MO), a magnetic disk, a hard disk, a magnetic tape or a memory (ROM). The processing section 100 performs various kinds of processes according to this embodiment, based on programs (or data) which have been stored in this information storage medium 180. In other words, the information storage medium 180 has stored (or recorded) a program for causing a computer to function various sections (or means) according to this embodiment or for causing a computer to implement these sections.

A display section 190 outputs an image generated by this embodiment, its function being able to be implemented by hardware such as CRT, LCD or HMD (head-mount display).

A sound output section 192 outputs a sound generated by this embodiment, its function being able to be implemented by hardware such as loud speakers or headphones.

A portable information storage 194 stores a player's personal data or to save data relating to a game and may be of any form such as a memory card or a portable game device.

A communication section 196 performs various controls for communications between the game system and any other external instrument (e.g., a host device or another image generation system), its function being able to be implemented by hardware such as various kinds of processors or ASIC or programs.

The program (or data) for causing the computer to function as the respective units or sections (or means) according to this embodiment may be distributed from the information storage medium possessed by the host device (or server) through a network and the communication section 196 into the information storage medium 180 (or storage section 170). Use of the information storage medium in such a host device (or server) is also included within the scope of the present invention.

The processing section (or processor) 100 performs processing for game, image generation or sound generation, based on the operation data and programs from the operating section 160. In this case, the processing section 100 performs various processings using a main storage portion 172 in a storage section 170 as a work region. The function of this processing section 100 can be implemented by hardware such as various processors (CPU, DSP and the like) or ASIC (gate array or the like) or a program (or game program).

The processing section 100 comprises a movement/action processing section 110, an object space setting section 112, a virtual camera controlling section 114, an image generating section 120 and a sound generating section 130. The processing section 100 does not necessarily include all of these section (or functional blocks), but some may be omitted.

The movement/action processing section 110 determines the information of movement (position and rotational angle) relating to an object (or moving body) and the information of action (positions and rotational angles of object parts). That is to say, the movement/action processing section 110 performs a processing of causing the object to move and/or act (motion and animation), based on the control data inputted by the player through the operating section 160 and/or a game program.

The object space setting section 112 arranges various objects such as movable bodies (characters, motorcars, tanks and robots), posts, walls, buildings and maps (landforms) within the object space. These objects may be formed by primitive faces such as polygons, free-form surfaces or sub-division surfaces. More particularly, the object space setting section 112 determines the position and rotational angle (direction) of an object in the world coordinate system and locates the object at that position (X, Y, Z) with that rotational angles (about X-, Y- and Z-axes).

The virtual camera operating section 114 controls a virtual camera set in the object space. That is to say, the virtual camera operating section 114 determines the information of virtual camera such as a virtual camera position (X, Y, Z) or virtual camera rotations (about X-, Y- and Z-axes) to control the virtual camera.

It is desirable that, for example, if a moving object is photographed from the rear thereof by the virtual camera, the position or rotation (or direction) of the virtual camera is controlled so that it follows the changed position or rotation of the moving body. In this case, the virtual camera will be controlled based on the information obtained by the movement/action processing section 110, including the position, direction or velocity of the moving body. Alternatively, the virtual camera may be rotated through a predetermined angle while moving it along a predetermined path of movement. In such a case, the virtual camera will be controlled based on information relating to a path of camera movement which has previously been provided to specify the position (or path of movement) and/or rotational angle of the virtual camera.

The image generating section 120 draws or generates an image based on the results of various processings at the processing section 100 and outputs it toward the display section 190. For example, if a so-called three-dimensional game image is to be generated, various geometry-processings such as coordinate conversion, clipping, perspective conversion and light-source computation are first carried out with the results thereof being then used to prepare drawing data (which may include the positional coordinates, texture coordinates, color (or brightness) data, normal vector or α-value that is to be applied to each vertex (or composing point) in a primitive face) And, based on this drawing data (or primitive face data), the image of the geometry-processed object (which may consist of one or more primitive faces) is then drawn in a drawing buffer 174 (which may be a frame or work buffer for storing the image information by pixel unit). Thus, an image visible from the virtual camera (or a given viewpoint) in the object space will be generated.

The image generating section 120 uses a Z buffer 176 stored the Z-value (depth value) to perform the hidden-surface removal through the Z-buffer method (or depth comparison method). Furthermore, the image generating section 120 maps a texture stored in a texture storage section 178 onto an object (primitive face). In such a case, the image generating section 120 can perform the texture mapping using a lookup table (LUT) for index color texture mapping stored in an LUT storage section 179.

The sound generating section 130 performs a sound processing based on the results of various processings at the processing section 100 to generate game sounds such as BGMs, effect sounds or voices, which are in turn outputted toward the sound output section 192.

The image generating section 120 includes an α-value synthesis section 122 which synthesizes the first α-value with an α-nonuniformity setting α-value (including the multiplication, addition, division or subtraction of α-values) to generate the second α-value.

In the first α-value, the α-value for each pixel is set, for example, at a value depending on the Z-value of each pixel in the original image. In the α-nonuniformity setting α-value, further, the α-value of each pixel in a virtual plane (between pixels) is nonuniformly set.

The original image may be one that is generated by drawing an object into the drawing buffer 174 while performing the hidden-surface removal through the Z buffer 176 stored the Z-values, for example. And, the Z-value in the original image is generated (or stored) on the Z buffer 176 through the Z-buffer method (or depth comparison method) which is carried out in this drawing process.

The Z-value (depth value) in this embodiment may be a Z-value itself on the Z coordinate axis in the camera coordinate system or a parameter mathematically equal to this Z-value. For example, the Z-value may be a parameter corresponding to an inverse number of Z-value in the camera coordinate system or a parameter provided by subjecting the Z-value in the camera coordinate system to a given converting process.

The image generating section 120 also includes a color synthesis section 124 for performing a process of synthesizing the color of the original image with a given color (e.g., fog color) based on the second α-value (which process, in a broad sense, is to generate an image based on the second α-value). The synthesizing process in this case may be of any one of α-blending (which is a narrow α-blending), addition α-blending or subtraction α-blending. Such a synthesizing process can generate an image in which the original image is covered with a fog (which may include a cloud, a steam, a mist, dust, dirt, smoke, tornado or dew).

If it is exemplified that the synthesizing is α-blending (or narrow α-blending), the color synthesis section 124 carries out synthesize processing according to the following expressions.

$$R_Q = (1-\alpha) \times R_1 + \alpha \times R_2 \tag{1}$$

$$G_Q = (1-\alpha) \times G_1 + \alpha \times G_2 \tag{2}$$

$$B_Q = (1-\alpha) \times B_1 + \alpha \times B_2 \tag{3}$$

In these expressions, $R_1$, $G_1$ and $B_1$ are R, G and B components of the color (or brightness) in the original image (which has already been drawn in the drawing buffer 174) while $R_2$, $G_2$ and $B_2$ are R, G and B components of the given color (or fog color). Furthermore, $R_Q$, $G_Q$ and $B_Q$ are R, G and B components in the color of an image provided by the α-blending (or a completion image or a fog image).

The α-value (A-value) is information which can be stored associated with each pixel (texel or dot). For example, it may be +alpha information other than the color information. The α-value can be used as mask information, translucency information (which is equivalent to transparency and opacity) or bump information.

The image generation system of this embodiment may be dedicated for a single-player mode in which only a single player can play a game or may have a multi-player mode in which a plurality of players can play a game simultaneously.

If a plurality of players play the game, a single terminal maybe used to generate game images and game sounds to be provided to these plural players. Alternatively, these game images and sounds may be generated through a plurality of terminals (game machines or cellular phones) which are interconnected through a network (or transmission line, telecommunication line).

2. Techniques in the Embodiment

The techniques in this embodiment will now be described with reference to the drawing.

Although there will be described a case when a technique according to this embodiment is applied to represent a fog nonuniformity, this technique may be applied to represent any image other than the fog nonuniformity.

2.1 Change of Fog Density Depending on Distance

In order to represent the effect of fog more realistically, it is desirable to change the fog density depending on the distance from the virtual camera (or viewpoint). That is to say, the fog density is increased as that distance increases.

To change the fog density in such a manner, it is desirable to change the $\alpha$-value, which is a parameter for controlling the fog density, depending on the distance from the virtual camera. That is to say, the $\alpha$-value is controlled so that the fog density increases as the distance from the virtual camera increases.

For such a reason, this embodiment takes a technique of converting a Z-value, which is a parameter of the distance from virtual camera (depth distance), into an $\alpha$-value. More particularly, a Z-value ZP in an original image (which has been drawn in a drawing buffer) is converted into the first $\alpha$-value $\alpha$P1, as shown by A1 in FIG. 2.

Figure 2:
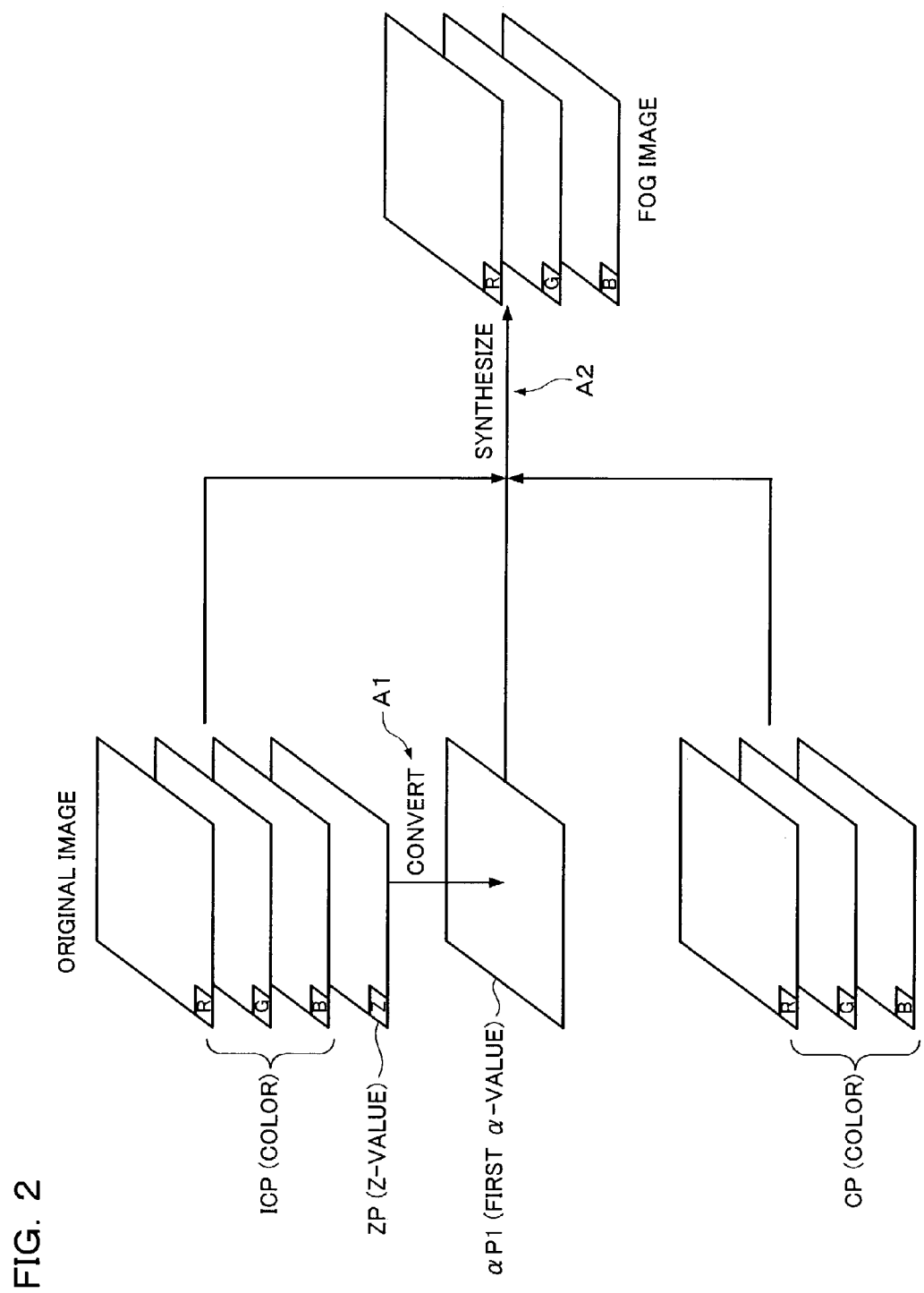
FIG. 2 illustrates a technique of converting a Z-value of an original image into an alpha ($\alpha$)-value and using the $\alpha$-value to synthesize the original image colors with the fog color.

The color ICP of the original image (RGB or YUV) is then synthesized with the color CP of the fog (white or gray) based on $\alpha$P1, as shown by A2 in FIG. 2. Thus, there can be generated a fog image provided by applying the fog effect to the original image (which fog image is, in a broad sense, a completed image).

This embodiment implements the conversion of the Z-value shown by A1 in FIG. 1 into the $\alpha$-value by effectively using the index color texture mapping.

Figure 3:
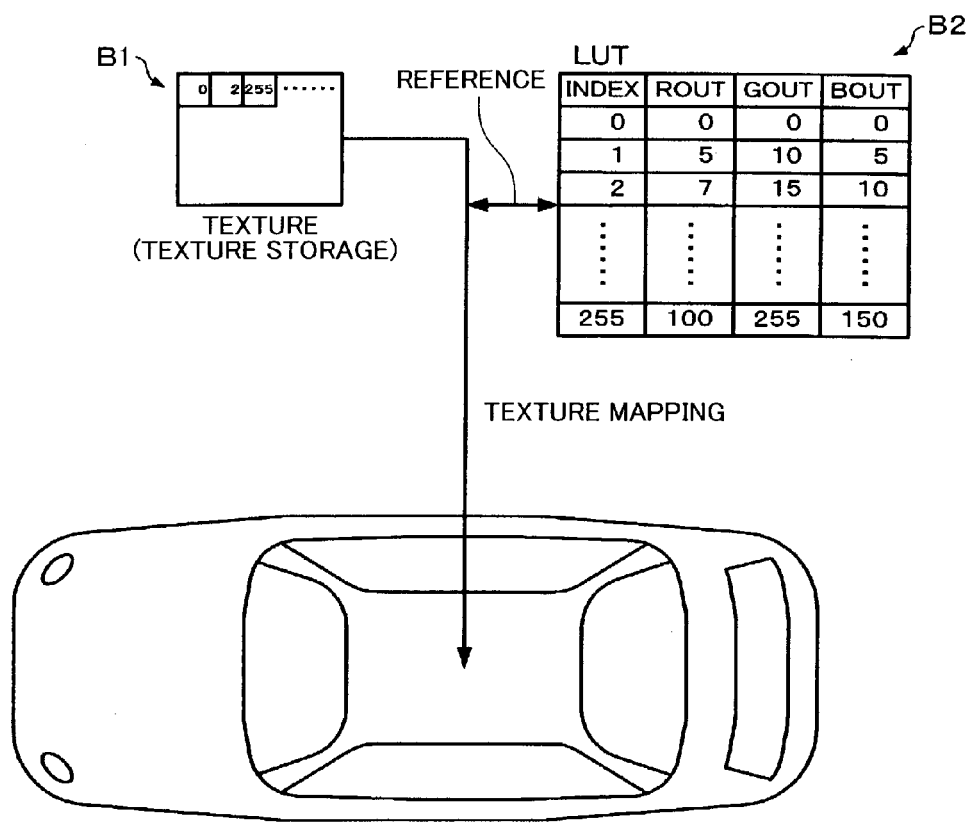
FIG. 3 illustrates an index color texture mapping.

That is to say, in the index color texture mapping, an index number is stored associated with each texel in the texture, rather than the actual color information (RGB) for saving the memory capacity of the texture storage, as shown by B1 in FIG. 3. As shown by B2 in FIG. 3, moreover, the color information specified by the index number is stored in LUT (color palette) for index color texture mapping. When the texture mapping is to be made on an object, LUT is referred to based on the index number for each texel in the texture to read the corresponding color information out of the LUT. The read color information is then drawn in the drawing buffer (or frame buffer).

In the texture mapping of such an index color mode, the number of usable colors is reduced, for example, to 256 colors, in comparison with the texture mapping in the normal mode which does not use LUT. However, the texture storage section can largely save the memory capacity used therein since the texture storage section is not necessary to store the actual color information (e.g., the color information of 24 bits).

This embodiment uses such an index color texture mapping in a manner different from the normal manner.

Figure 4:
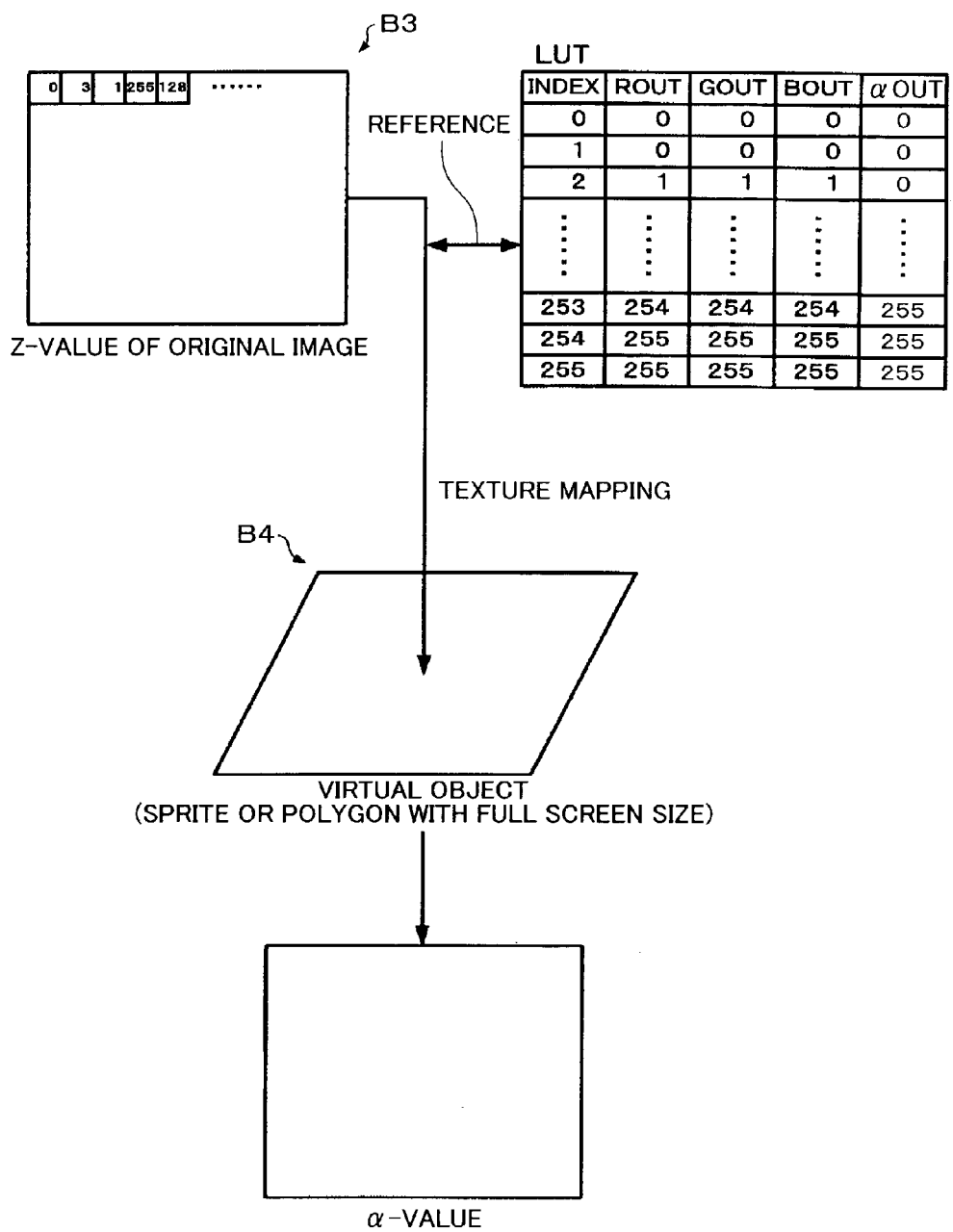
FIG. 4 illustrates a technique of using the index color texture mapping to convert a Z-value into an $\alpha$-value.

That is to say, the Z-value for each pixel in the original image is first treated as an index number in the lookup table LUT (Z-value is considered to be an index number), as shown by B3 in FIG. 4. The index color texture mapping is then made against a virtual object (e.g., a sprite polygon having a display screen size) to change the Z-value (image information) in the original image, using the LUT in which the Z-value of the original image has been set as an index number, as shown by B4. Thus, an $\alpha$-value set by a value depending on the Z-value for each pixel in the original image can be provided.

Although the texture mapping is made against the virtual object having the display screen size in FIG. 4, the texture mapping may be made against a virtual object having a size provided by dividing the display screen.

2.2 Fog Nonuniformity

According to the technique of FIG. 2, the fog effect providing its variable tone depending on the Z-value (or the distance from the virtual camera) can be applied to the original image. And yet, the technique of FIG. 2 is advantageous in that it can reduce its processing load since it is only required to perform the index color texture mapping against the virtual object.

However, the technique of FIG. 2 raises a problem in that it cannot represent a fog having its nonuniform tone (density), that is, a nonuniform fog.

In this case, a technique of providing a tone of color such as white color, gray color or black color to the color CP of FIG. 2 (a fog-colored sprite) maybe considered, for example.

However, such a technique can only produce $\alpha$gray- or black-colored fog, but not provide a fog having its nonuniform tone.

To overcome such a problem, this embodiment adopts a technique of providing a nonuniform $\alpha$-value, that is, a technique of unequalizing the $\alpha$-value in a virtual plane (between pixels).

Figure 5:
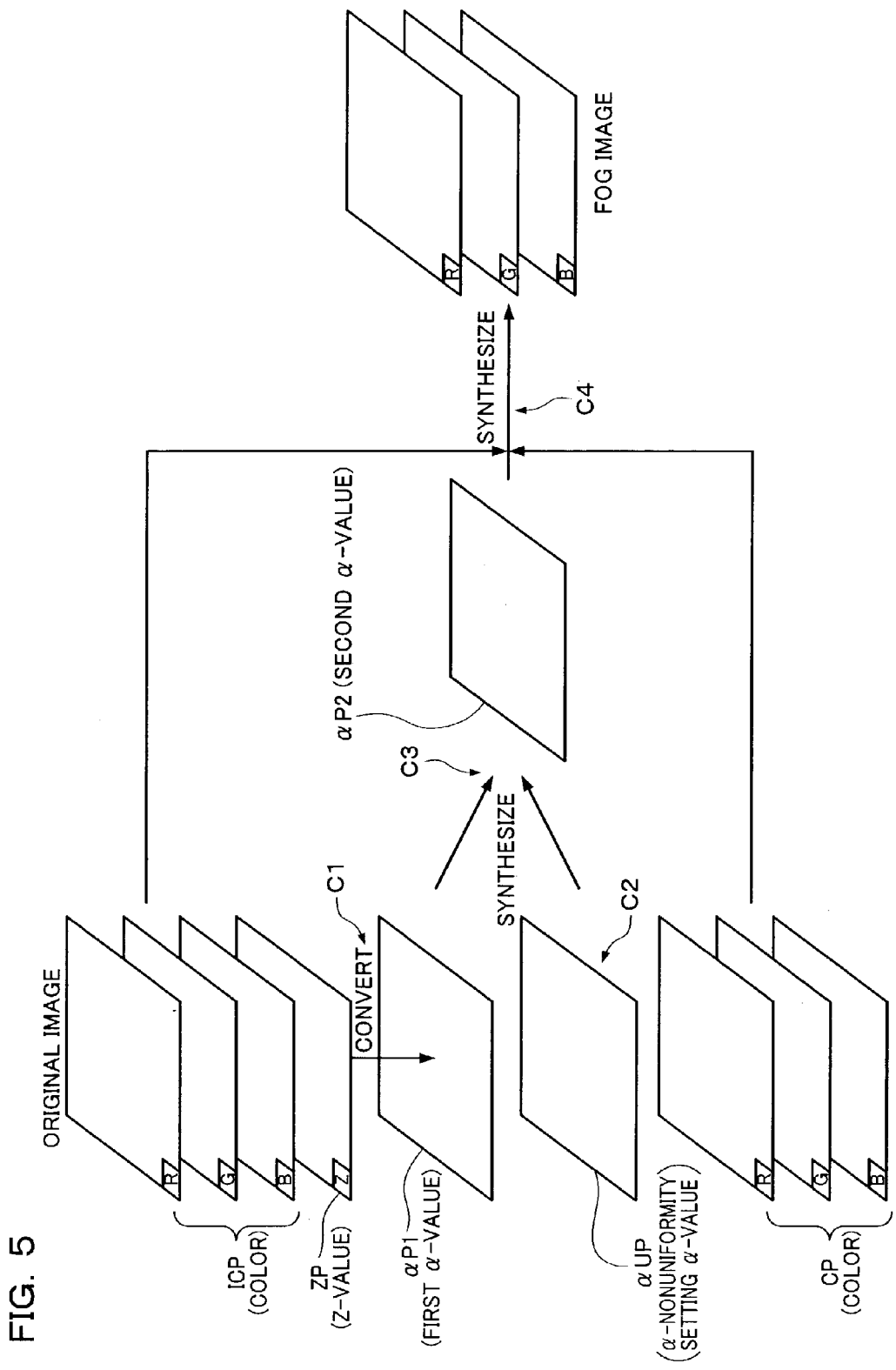
FIG. 5 illustrates a technique of synthesizing according to one embodiment of the present invention.

That is to say, first of all, this embodiment changes the Z-value (Z plane) ZP in the original image in the same manner as in FIG. 2, as shown by C1 in FIG. 5. This provides the first $\alpha$-value (or first $\alpha$-plane) $\alpha$P in which the $\alpha$-value for each pixel is set depending on the value ZP. In this case, the conversion from ZP to $\alpha$P1 is implemented, for example, by the conversion using the index color texture mapping as described in connection with FIG. 4.

This embodiment further provides an $\alpha$-nonuniformity setting $\alpha$-value (or $\alpha$-nonuniformity setting $\alpha$-plane) $\alpha$UP in which the $\alpha$-value is nonuniformly set in the virtual plane, as shown by C2 in FIG. 5. The details of this $\alpha$UP generating technique will be described later.

This embodiment then provides the second $\alpha$-value (or second $\alpha$-plane) $\alpha$P2 by synthesizing the values $\alpha$-value P1 and $\alpha$UP, as shown by C3 in FIG. 5. In such a manner, the $\alpha$-value (fog density) in which both the Z-value and $\alpha$-nonuniformity (a nonuniformity pattern) are added can be provided. The synthesizing of $\alpha$-values may be carried out by multiplying the $\alpha$P1 and $\alpha$UP for each pixel. However, any synthesizing of $\alpha$-value addition, subtraction or division other than the multiplication may be adopted.

Next, this embodiment then generates a fog image (or completed image) by synthesizing the color ICP of the original image with the color CP (or fog color) based on the $\alpha$P2 thus provided, as shown by C4 in FIG. 5. At this time, the synthesizing of color may be the narrow $\alpha$-blending (the above numerical expressions (1) to (3)) or an addition $\alpha$-blending.

In the above-mentioned manner, a fog having its variable density depending on the Z-value (distance) with the density being nonuniform can be applied to the original image.

Figure 6:
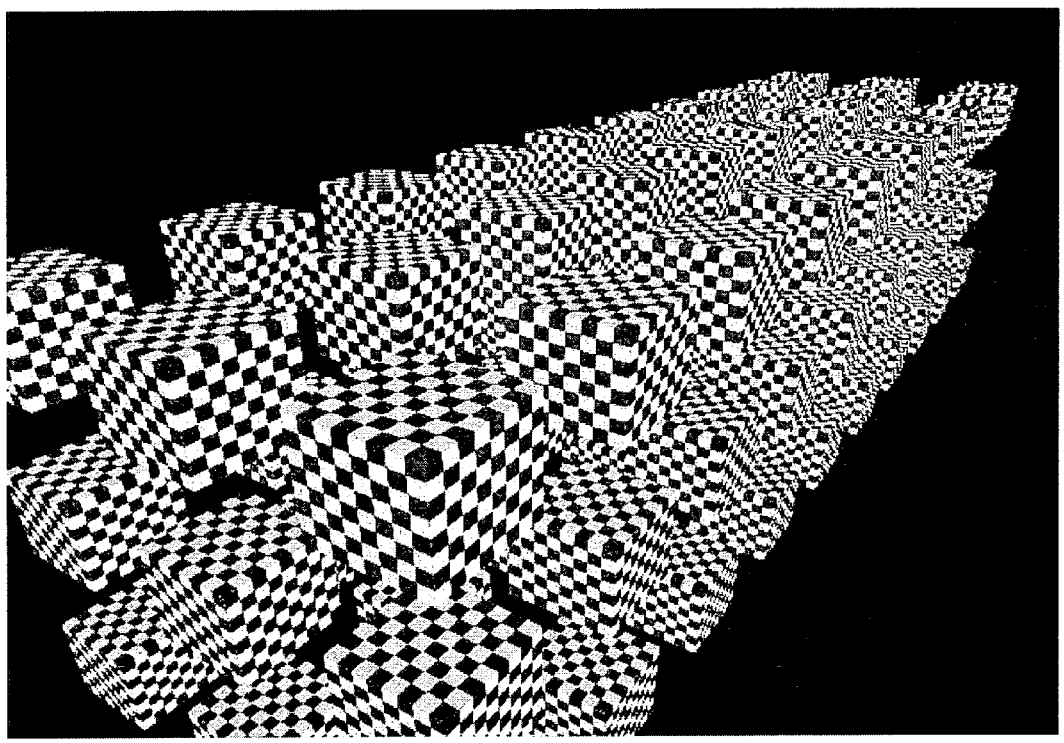
FIG. 6 shows an example of an original image.

FIG. 6 shows an example of the original image usable in this embodiment. This original image comprises a plurality of cube-shaped objects which are arranged in a slant direction from the left side to the right side as viewed from the virtual camera.

Figure 7:
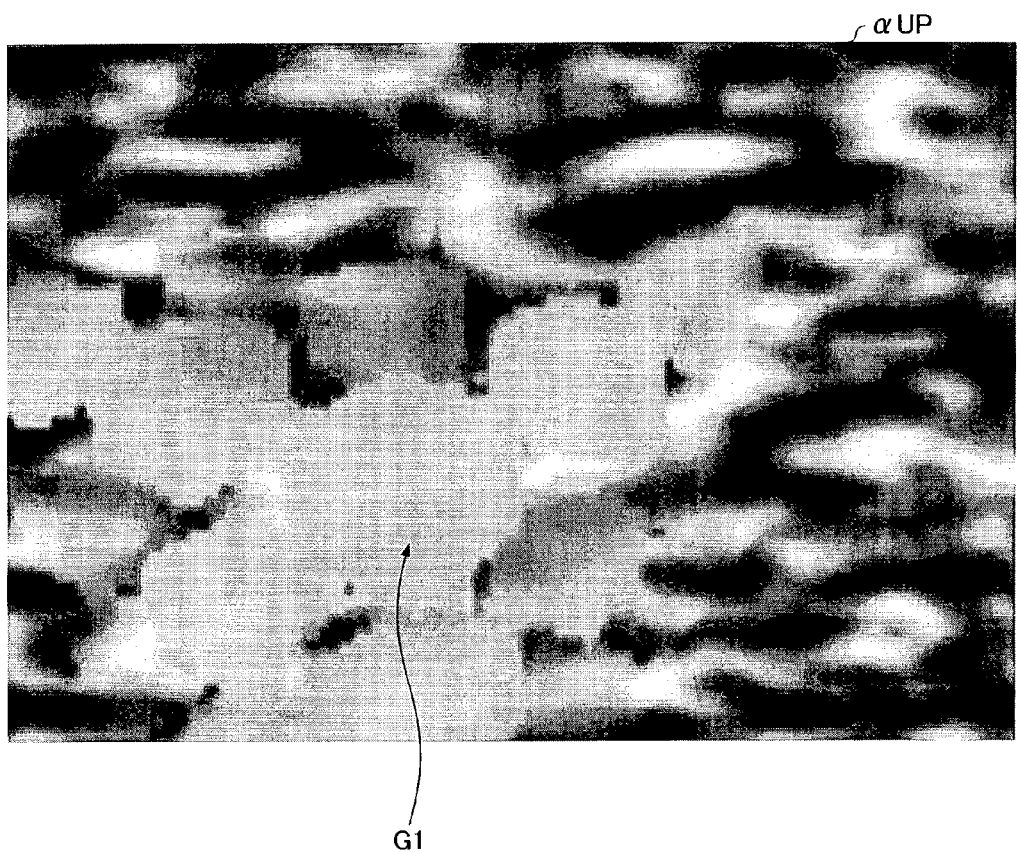
FIG. 7 shows an example of an $\alpha$-nonuniformity setting $\alpha$-value.
Figure 8:
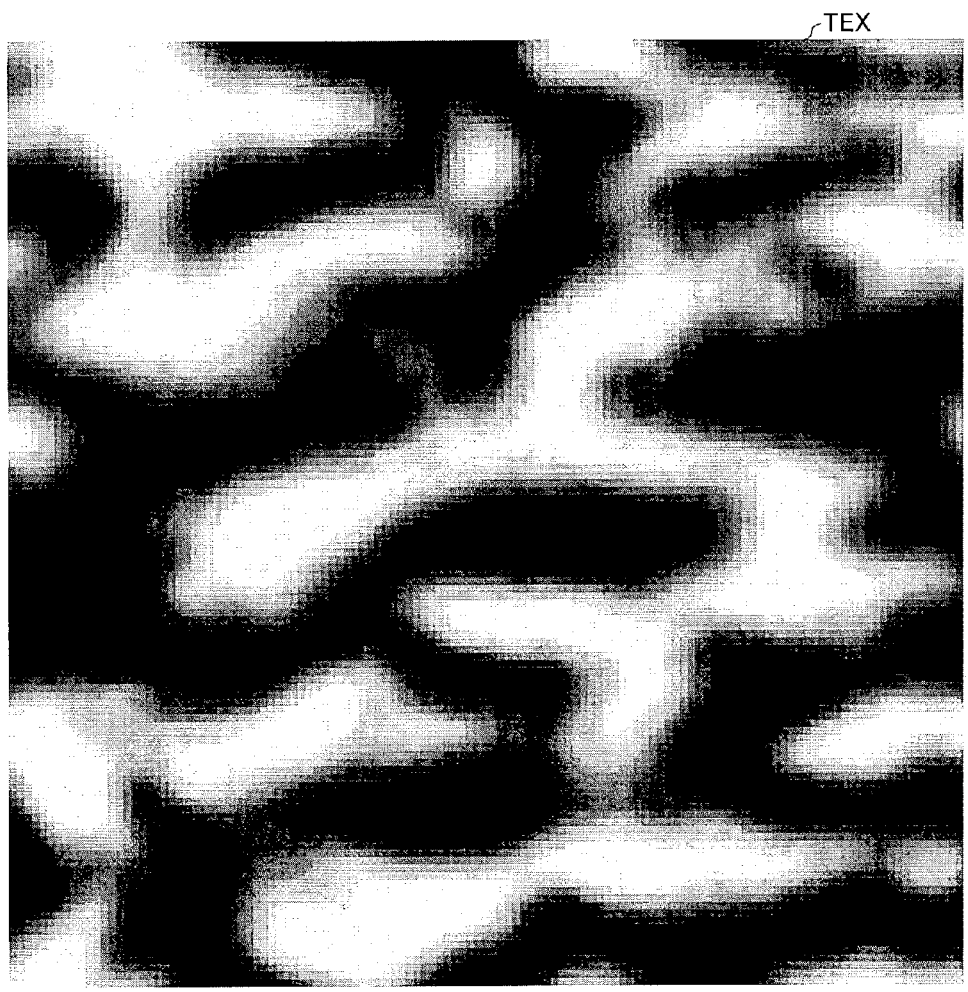
FIG. 8 shows an example of a nonuniformity pattern texture.

FIG. 7 shows an α-nonuniformity setting α-value αUP and FIG. 8 shows a nonuniformity pattern texture TEX which is used to generate this αUP. In FIGS. 7 and 8, each of the white-color parts has its reduced α-value to thin the fog density. On the other hand, each of the black-color parts has its increased α-value to thicken the fog density. In FIGS. 7 and 8, thus, the α-values (fog densities) are nonuniform within the virtual plane (screen).

Figure 9:
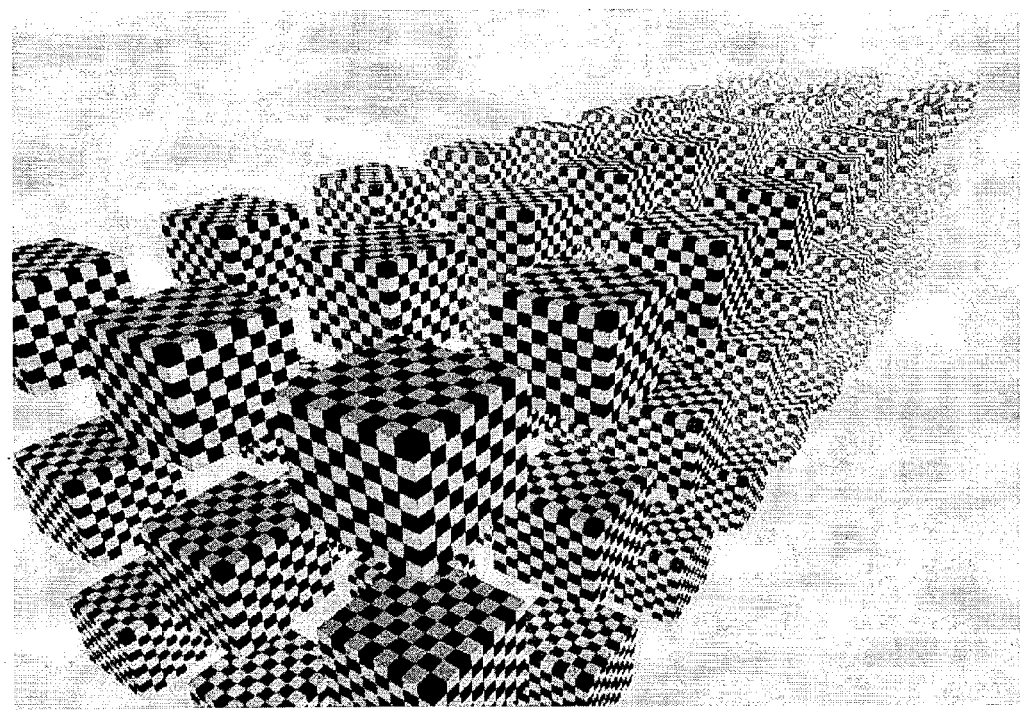
FIG. 9 shows an example of a fog image generated according to one embodiment of the present invention.
Figure 10:
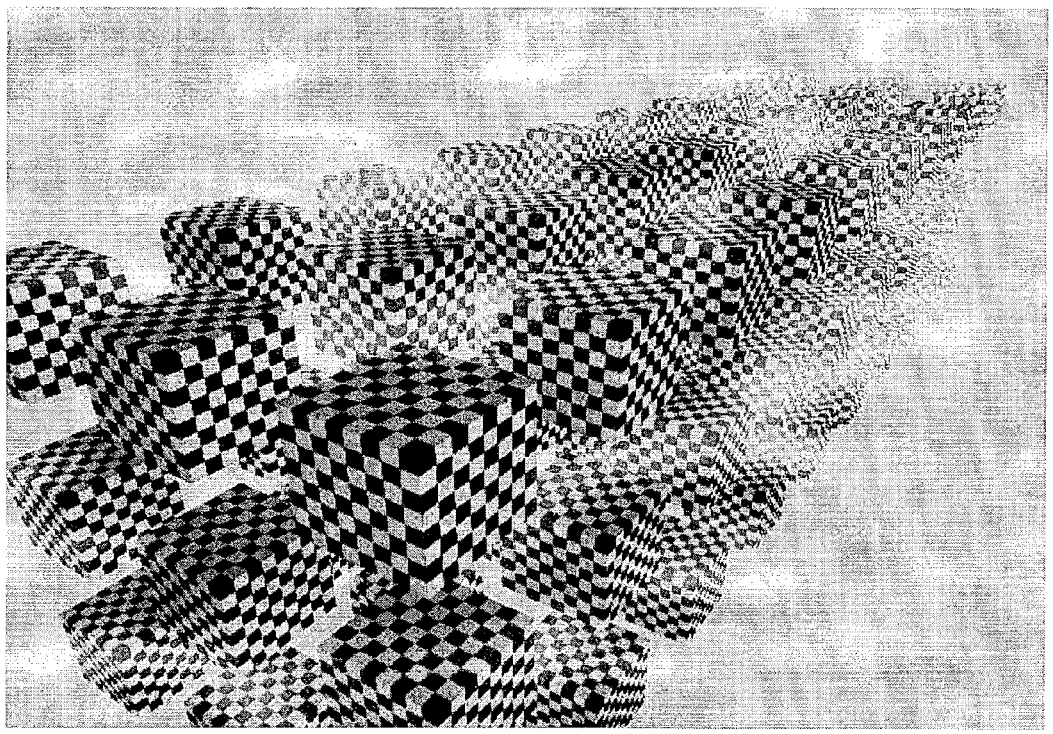
FIG. 10 shows another example of a fog image generated according to one embodiment of the present invention.

FIGS. 9 and 10 show fog images generated according to this embodiment. According to this embodiment, the density of fog increases as the distance from the viewpoint (virtual camera) increases, as shown in FIGS. 9 and 10. In addition, it looks as if the object is covered with an actual fog since the fog density is uneven. This is successful in generation of an unprecedented realistic image.

2.3 Density and Intensity of Fog

Figure 11:
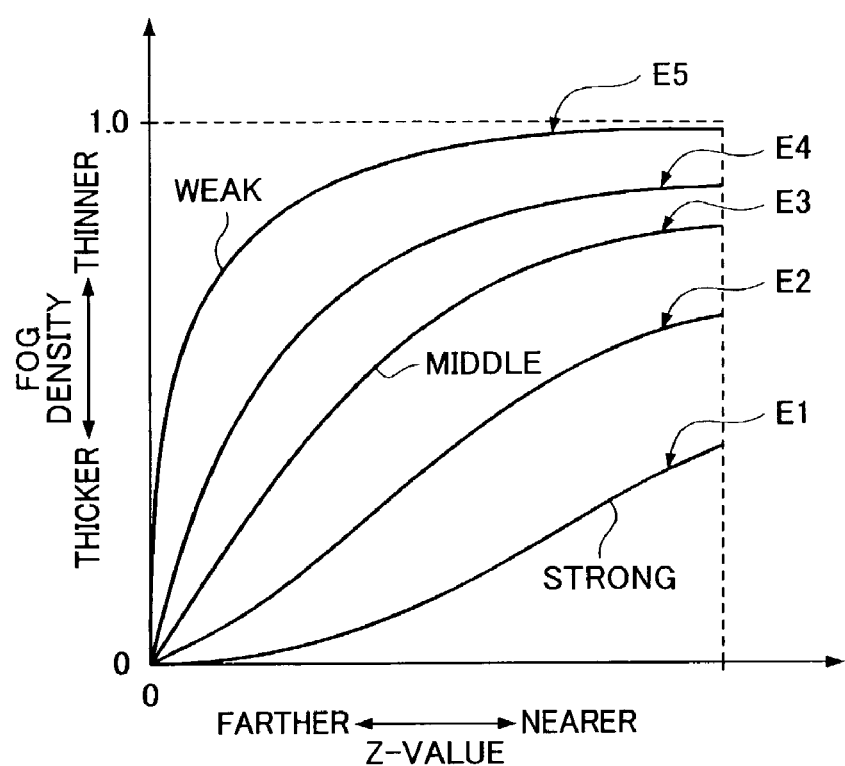
FIG. 11 is a graph showing the relationship between a Z-value and fog density in an exponential fog.

FIG. 11 illustrates the relationship between the Z-value (Z buffer value) and fog density in an exponential fog. Symbols E1 to E5 in FIG. 11 indicate characteristic curves for different intensities of fog. The characteristic curve E1 has the maximum fog intensity while the characteristic curve E5 has the minimum fog intensity.

To represent the nonuniformity in the fog, it is changed depending on the fog density which is determined by the fog intensity and Z-value (distance from the virtual camera). And, it is desirable that the change of the fog density due to the nonuniformity has a tendency resembling the change of the fog intensity as much as possible.

On the other hand, the expression of α-blending used to add the nonuniformity is a primary function as shown in the above-mentioned numerical expressions (1) to (3). In this α-blending, therefore, an operation which can be carried out for the fog density (α-value) is limited to one that multiplies given magnifications about a given value.

Figure 12:
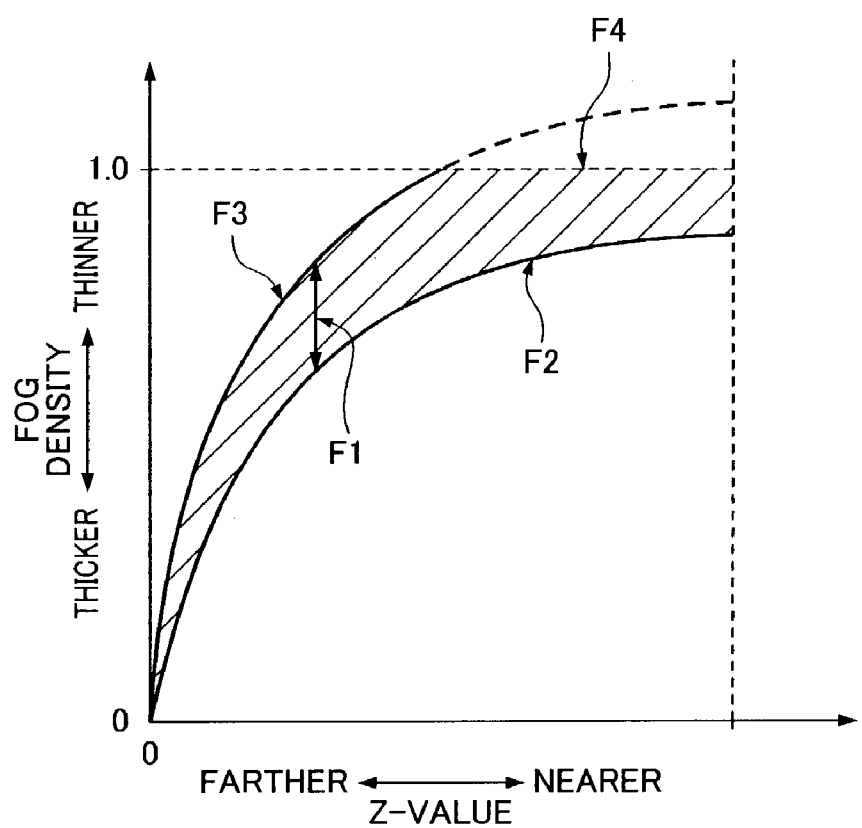
FIG. 12 is a graph showing how the nonuniformity of fog is formed.

In this embodiment, thus, an original fog density (α-value) shown y F2 is multiplied by a fog nonuniformity value larger than 1 to provide a fog density (F1) ranging between F2 and F3, as shown in FIG. 12. A clamping process for providing the upper limit of 1.0 (maximum value) is then applied to the resulting fog density F3, as shown by F4. The characteristic curves for the resulting fog densities F3 and F4 are similar to the characteristic curve of the fog density as shown by E5 in FIG. 11, thereby providing the fog density closer to the actual fog in the real world.

If the technique of setting the fog nonuniformity value larger than 1 as in this embodiment is adopted, the fog nonuniformity will disappear as the fog intensity decreases, even though the intensity of the fog nonuniformity is invariable. If the intensity of the fog nonuniformity is changed in conjunction with the fog intensity, it is not necessary to adopt the technique of setting the fog nonuniformity value larger than 1.

2.4 Multi-layering of Nonuniformity Pattern

If only a single virtual plane for the α-nonuniformity setting α-value is used, it looks as if the fog nonuniformity exists only at a certain depth. This cannot represent an enough real fog.

Figure 13:
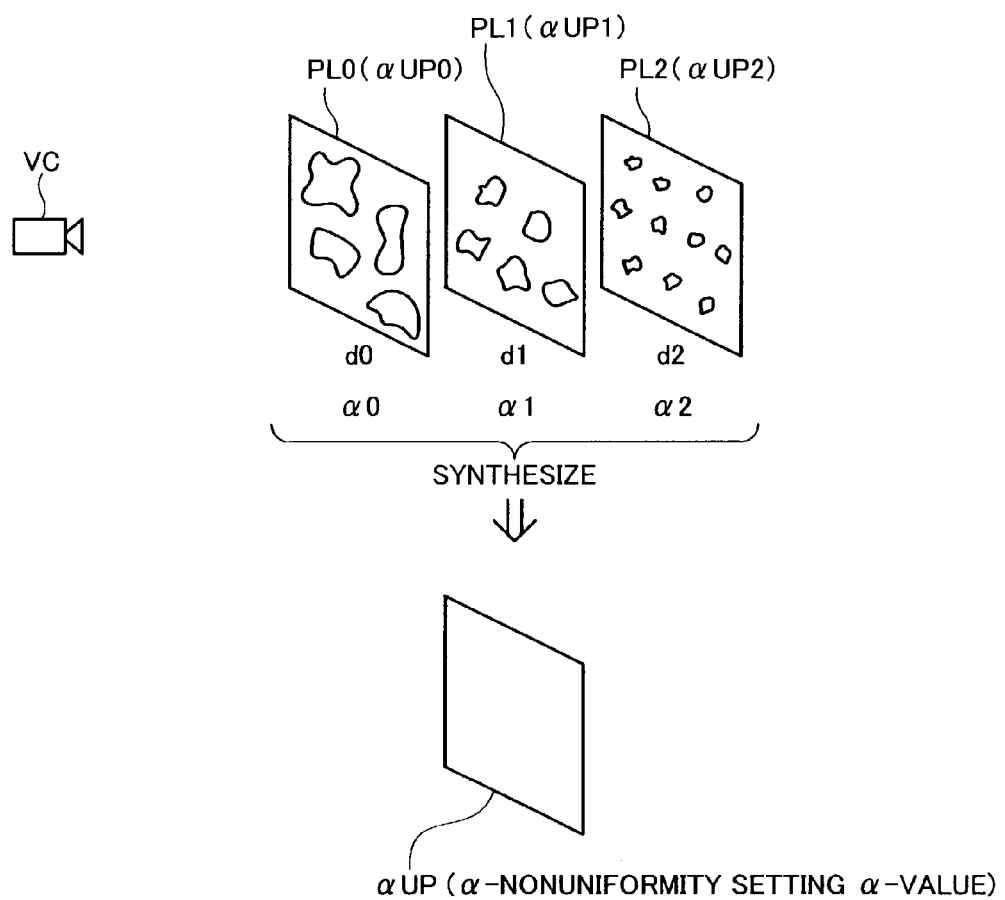
FIG. 13 is a diagram for illustrating a technique of synthesizing a plurality of $\alpha$-nonuniformity setting $\alpha$-values having different nonuniformity pattern in a virtual plane.

In this embodiment, thus, a plurality of virtual planes PL0, PL1 and PL2 (which number may be two or more than four) having different virtual distances d0, d1 and d2 from the virtual camera VC are virtually arranged, as shown in FIG. 13. For example, in FIG. 13, the virtual plane PL0 having its virtual distance d0 is virtually arranged at a position nearest to the virtual camera VC while the virtual plane PL2 having its virtual distance d2 is virtually arranged at a position farthest from the virtual camera VC.

This embodiment provides a plurality of α-nonuniformity setting α-values (a-planes) αUP0 to αUP2 having different nonuniformity patterns within these virtual planes PL0, PL1 and PL2. And, the α-nonuniformity setting α-valueαUP is generated by synthesizing these α-nonuniformity setting α-values αUP0 to αUP2 with other α-values α0 to α2 (synthesizing rates) which are provided based on the virtual distances d0 to d2 or the like. More particularly, two or more overdrawings are carried out on the work buffer by providing sprites SP0 to SP2 arranged corresponding to the virtual planes PL0 to PL2 and mapping the textures (see FIG. 8) of the α-nonuniformity setting α-values αUP0 to αUP2 over these sprites SP0 to SP2. Thus, an image in which two or more overlapping layers of the nonuniformity pattern can be viewed can be generated.

Figure 14A:
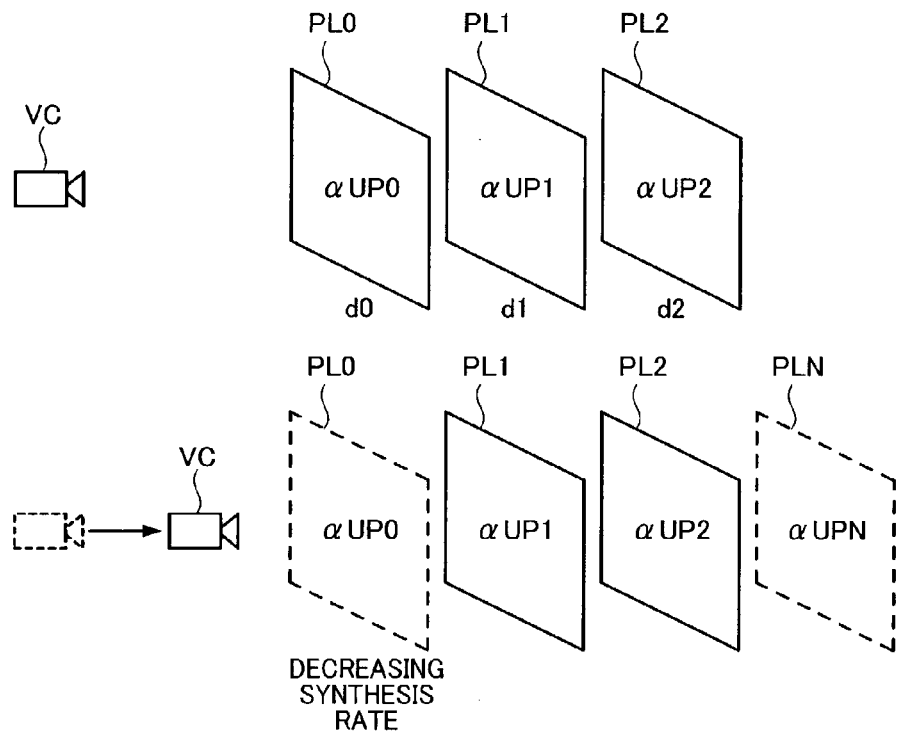
FIGS. 14A and 14B are also diagrams for illustrating a technique of synthesizing a plurality of α-nonuniformity setting α-values having different nonuniformity pattern in a virtual plane.

This embodiment reduces and gradually extinguishes the synthesizing rate (blend rate) of the α-nonuniformity setting α-value αUP0 corresponding to the virtual plane PL0 if the virtual camera VC moves (forward) to reduce the virtual distance d0 of the nearest virtual plane PL0 to a level smaller than a given distance, as shown in FIG. 14A. And, a new virtual plane PLN is then produced at a position deeper than the virtual plane PL2 and the synthesizing rate of the α-nonuniformity setting α-values αUPN corresponding to the new virtual plane PLN is then gradually increased.

Figure 14B:
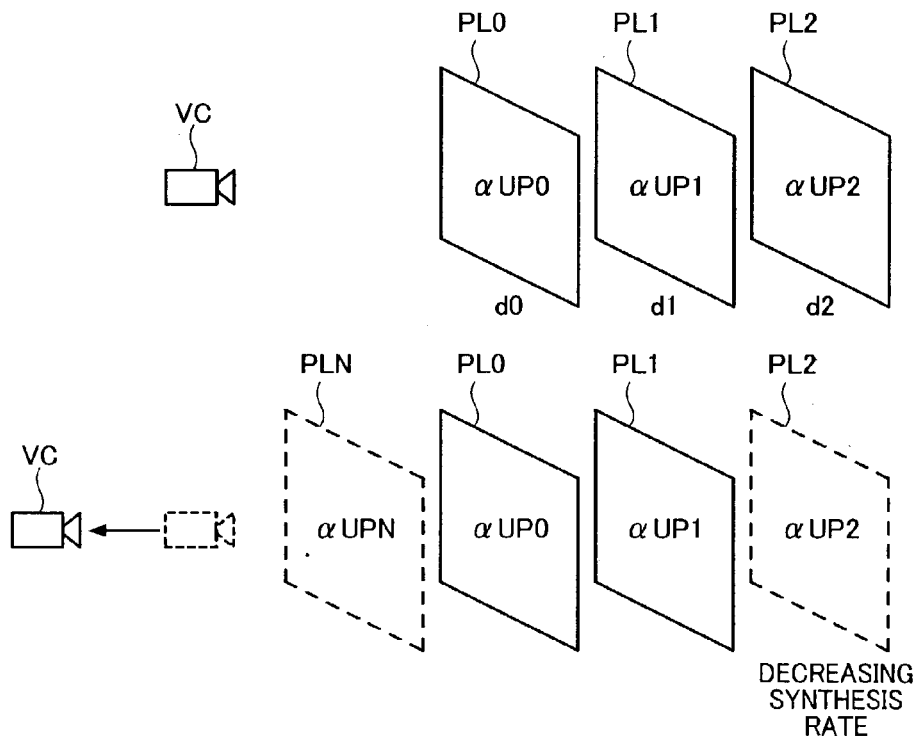

On the other hand, the synthesizing rate of the α-nonuniformity setting α-value αUP2 corresponding to the virtual plane PL2 is reduced and gradually extinguished if the virtual camera VC moves (backward) to reduce the distance d2 of the deepest virtual plane PL2 to a given distance, as shown in FIG. 14B. And, a new virtual plane PLN is produced in the front of the virtual plane PL0 and the synthesizing rate of the α-nonuniformity setting α-value αUPN corresponding to the virtual plane PLN is gradually increased.

When such a process as shown in FIGS. 14A and 14B is carried out, the effect similar to that in the case where infinite virtual planes are used can be provided while using a finite number of virtual planes of αUP0 to αUP2.

2.5 Change of Nonuniformity Pattern Based on Virtual Camera Information

This embodiment changes the nonuniformity pattern in the virtual plane for α-nonuniformity setting α-value, based on the virtual camera information (the position or orientation of the virtual camera) and time information (which represents the course of time or frame).

Figure 15A:
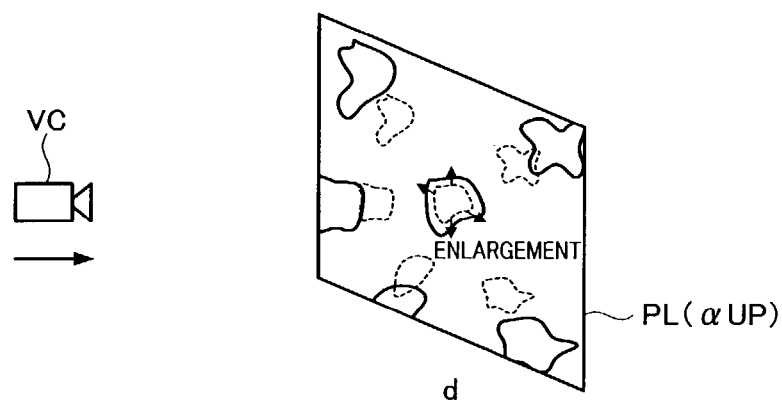
FIGS. 15A and 15B are diagrams for illustrating a technique of changing the nonuniformity pattern based on the virtual camera information.

More particularly, the nonuniformity pattern of αUP corresponding to PL is enlarged as the virtual distance d (d0 to d2) between the virtual camera VC and the virtual plane PL (PL0 to PL2) decrease, as shown in FIG. 15A. On the contrary, the nonuniformity pattern of αUP is reduced as the virtual distance d increases.

In such a manner, as shown in FIG. 13, the αUP0 in the virtual plane PL0 having its virtual distance d0 closer to the virtual camera VC will have its increased nonuniformity pattern while the αUP2 in the virtual plane PL2 having its increased virtual distance d2 will have its decreased nonuniformity pattern. Therefore, the nonuniformity pattern can be made to have the feeling of depth or third dimension, thereby providing a more realistic image.

Figure 15B:
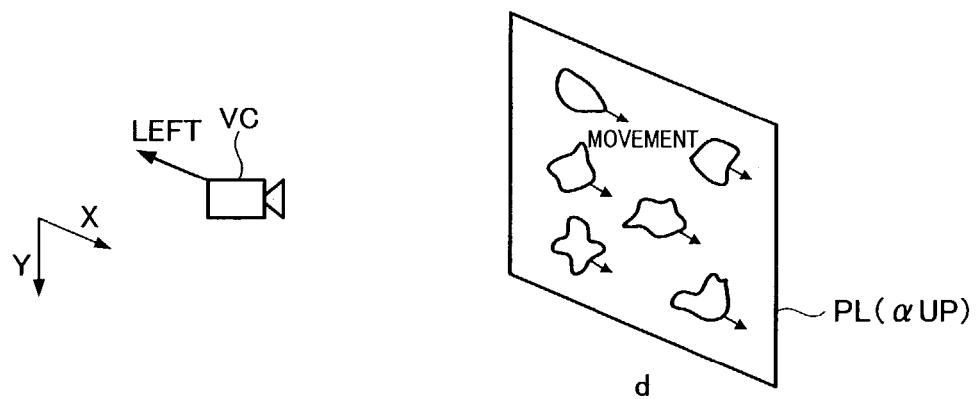

When the virtual camera VC moves to the first direction (e.g., leftward direction) parallel to the screen (i.e., X-Y plane in the screen coordinate system), this embodiment moves the nonuniformity pattern of αUP (αUP0 to αUP2) by an appropriate distance in the second (e.g., rightward) direction, as shown in FIG. 15B.

In this case, this embodiment changes the distance of movement in the nonuniformity pattern depending on the virtual distance d (d0-d2) in the virtual plane PL (PL0-PL2). More particularly, in FIG. 13, with αUP0 of the virtual plane PL0 having its smaller virtual distance d0, the distance of movement in the nonuniformity pattern corresponding to the movement of the virtual camera VC is increased while, with αUP 2 of the virtual plane PL2 having its larger virtual distance d2, the distance of movement in the nonuniformity pattern corresponding to the movement of the virtual camera VC is reduced Thus, an image looked as if a three-dimensional fog exists can be generated in spite of a flat virtual plane used therein.

This embodiment generates such an α-nonuniformity setting α-value αUP (αUP0 to αUP2) as shown in FIG. 7 by mapping such a nonuniformity pattern texture TEX (α-nonuniformity setting texture) as shown in FIG. 8 onto a virtual object (sprite or polygon). And, this embodiment changes texture coordinates set at the virtual object (texture coordinates given to each vertex), based on the virtual camera information (or time information).

Figure 16A:
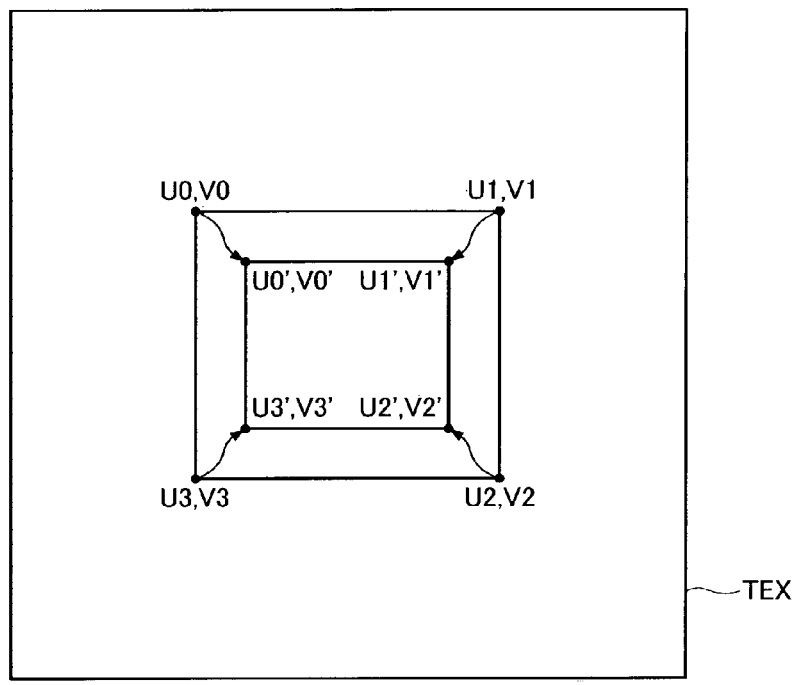
FIGS. 16A and 16B are diagrams for illustrating a technique of changing the nonuniformity pattern by setting the texture coordinates of a virtual object.
Figure 16B:
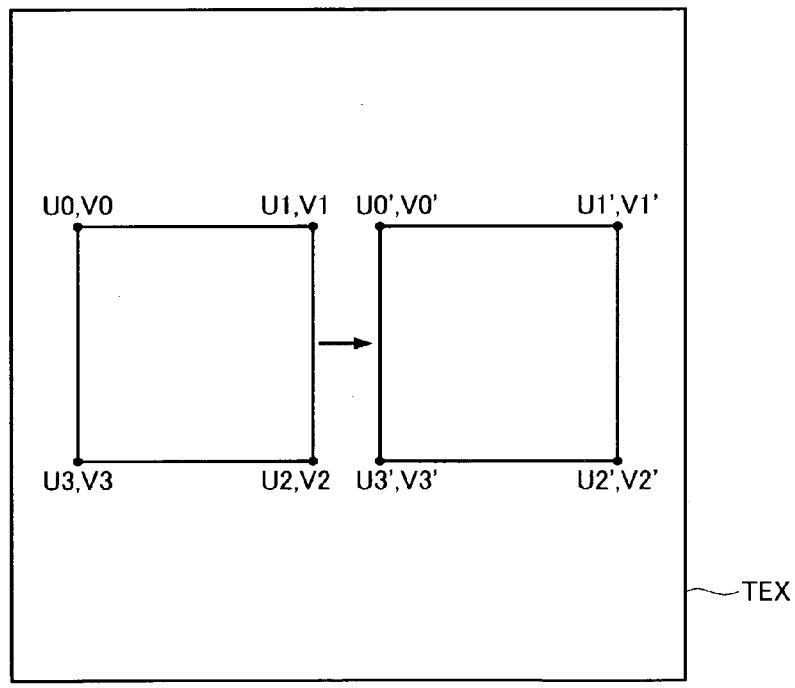

More particularly, the texture coordinates (U0, V0) to (U3, V3) given to the virtual object are changed based on the virtual camera information, as shown in FIGS. 16A and 16B.

For example, the enlargement of the nonuniformity pattern described in connection with FIG. 15A can be implemented, for example, if texture coordinates used to read a texture TEX are changed from (U0, V0)-(U3, V3) to (U0', V0')-(U3', V3'), as shown in FIG. 16A. On the contrary, the reduction of the nonuniformity pattern can be implemented if the texture coordinates are changed from (U0', V0')-(U3', V3') to (U0, V0)-(U3, V3).

On the other hand, the movement of the nonuniformity pattern described in connection with FIG. 15B can be implemented if the texture coordinates of a virtual object is changed as shown in FIG. 16B. That is to say, the movement of the nonuniformity pattern can be implemented by using a so-called texture scroll technique.

In addition, the flow of fog due to wind can be implemented if the nonuniformity pattern is moved or changed in size, based on the time information (or depending on the passage of time) That is to say, the nonuniformity pattern is moved based on a function F (VECC-VECW) where VECC is the movement vector of the virtual camera and VECW is the wind vector. Thus, the flow of fog nonuniformity can be provided.

2.6 Consideration of Z Buffer Value

It is desirable that when the fog nonuniformities (α-nonuniformity setting α-values) are to be superposed one on another, the Z-value (Z buffer value) of the original image which has been already drawn is considered. This is because an unnatural image will be generated when an object placed at a shallower position is covered with a fog nonuniformity to be placed at a deeper position.

And, the generated image will be unnatural if fog nonuniformities to be superposed one on another are drawn by judging the positional relationship in the ON/OFF manner as in Z test. Therefore, it is desirable to take a continually changing manner rather than the ON/OFF manner.

For such a reason, this embodiment sets α-values (α0 to α2 in FIG. 13) used to synthesize α-nonuniformity setting α-values, based on the Z-values in the original image.

Figure 17A:
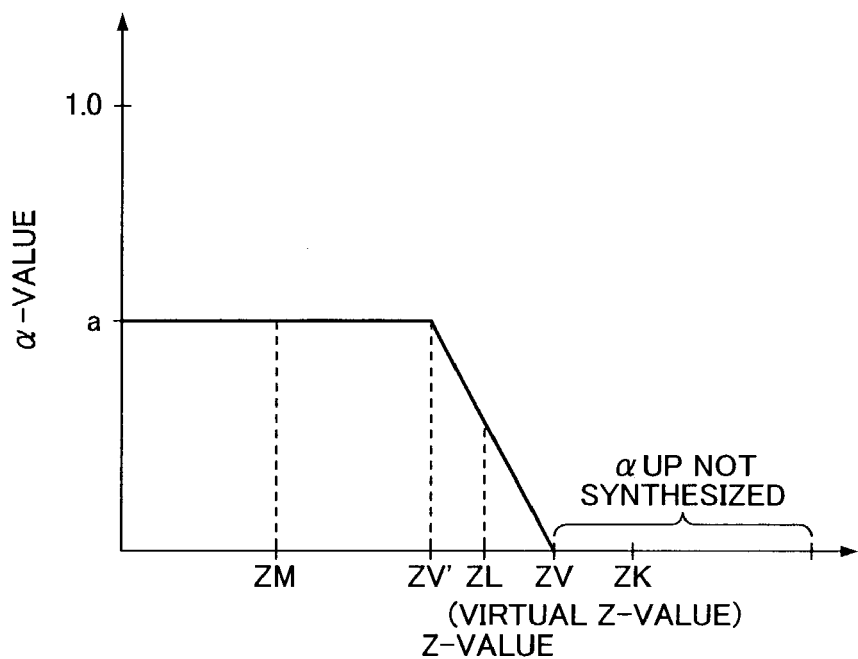
FIGS. 17A and 17B are graphs for illustrating a technique of setting an α-value used to synthesize α-nonuniformity setting α-values, based on a Z-value of an original image.

More particularly, the α-value α (α0 to α2) used to synthesize the αUP is set to provide such a Z-value/α-value characteristic as shown in FIG. 17A.

Figure 17B:
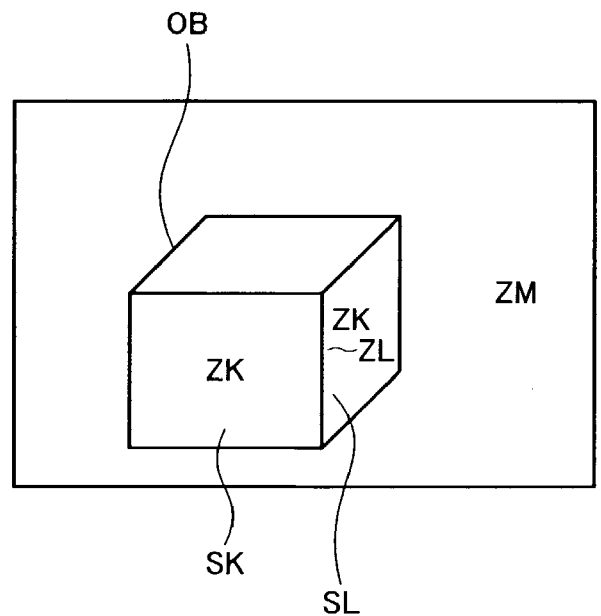

For example, it is assumed in FIG. 17B that the Z-value in the face SK of an object OB is ZK, the Z-values in the face SL are ZK to ZL and the Z-value in the background is ZM. It is also assumed that the virtual Z-value in the virtual plane of the α-nonuniformity setting α-value αUP (or virtual depth distance from the virtual camera) has been set at ZV.

In this case, αUP will not be formed in the face SK since α used to form αUP is equal to zero (minimum) at Z>ZV if it set as in FIG. 17A. Therefore, the face SK of the object OB will not be covered with the fog nonuniformity.

On the other hand, α used to form αUP is continuously changed for the Z-values in the face SL of the object OB in which the Z-values are ZK to ZL. Therefore, the density of fog nonuniformity in the face SL will continuously be changed.

In the background where Z-value become ZM, αUP will be synthesized with the synthesizing rate (blend rate) of α=a since α used to synthesize the αUP is equal to a. Therefore, the background will be covered with a fog having its thickened fog nonuniformity.

For example, in FIG. 7, α is at a predetermined value (e.g., 0 x 80) at such a part as shown by G1. Therefore, this part will not have any fog nonuniformity. Thus, such a more natural and realistic fog image as shown in FIG. 9 can be generated.

In addition, the Z-value/α-value characteristic shown in FIG. 17A can be implemented by such a technique using the index color texture mapping as described in FIG. 4.

More particularly, the Z-value in the original image is treated as an index number in the lookup table LUT for index color texture (i.e., the Z-value being considered to be an index number). Furthermore, the contents of the lookup table LUT are modified to represent such a Z-value/α-value characteristic as shown in FIG. 17A. The index color texture mapping is then carried out against a virtual object (sprite or polygon) which uses this lookup table LUT. Thus, the Z-values of the original image can be converted into the α-values used to synthesize the α-nonuniformity setting α-values, based on such a Z-value/α-value characteristic as shown in FIG. 17A.

Thus, various Z-value/α-value characteristics can be provided simply by modifying the contents of the lookup table. Moreover, the processing load can be reduced, for example, since the Z-value of the original image can be converted into the corresponding α-value merely by performing a single texture mapping. However, the Z-value of the original image may be converted into the α-value through a technique different from one described in connection with FIG. 4.

3. Processing in this Embodiment

Details of the processing performed in this embodiment will be described in connection with the PAD diagrams shown in FIGS. 18, 19, 20 and 21.

Figure 18:
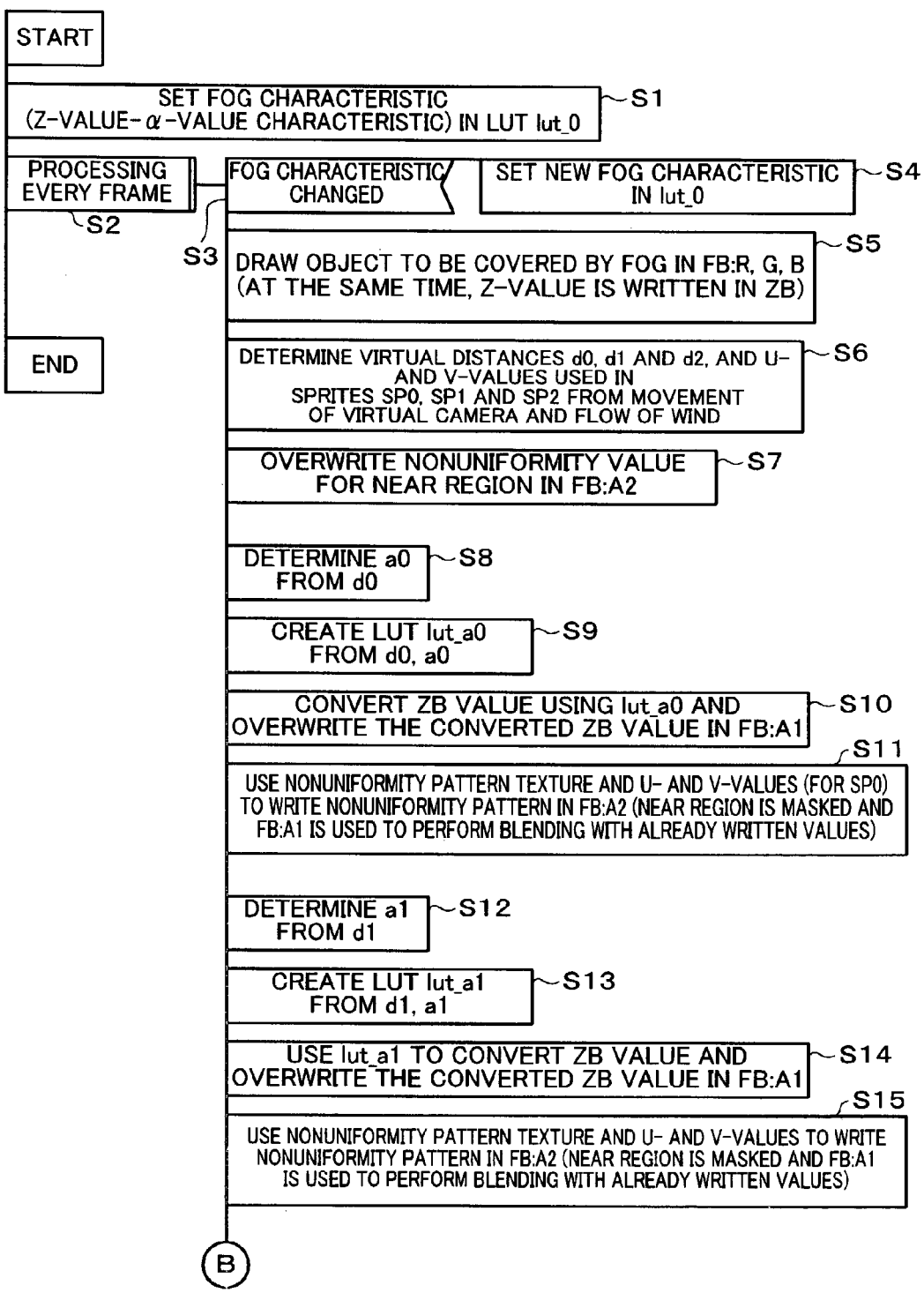
FIG. 18 is a program analysis diagram (PAD) showing details of processing in one embodiment of the present invention.
Figure 19:
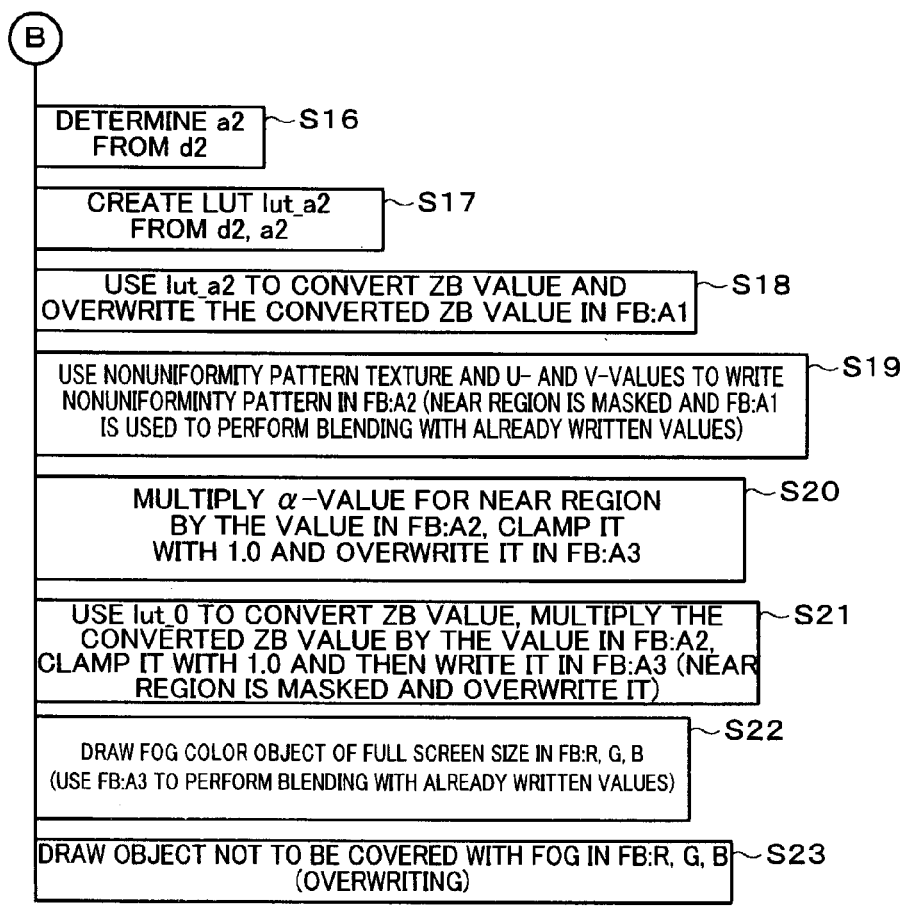
FIG. 19 is a PAD showing processing details in one embodiment of the present invention.

For convenience, it is assumed in FIGS. 18 and 19 that each pixel in the frame buffer (or drawing buffer) has three α-values (which will be referred to A1, A2 and A3). In a system in which each pixel in the frame buffer can have only one α-value, a working area may first be ensured on a memory as in the procedures of FIGS. 20 and 21 which will be described later. A1, A2 and A3 may be then substituted with appropriate values (e.g., Green values) other than the α-values. Thereafter, these values (Green values) may be converted into α-values.

In addition, a range of convertable Z-value may be restricted when the Z-value (Z buffer value) is to be converted into another value using the lookup table (LUT). For example, in a system in which the Z-value is 24 bits and increases toward the proximal side and decreases toward the distal side, the conversion using only eight bits at the middle of 24-bit value will be performed as follows.

That is to say, if the range of Z-value from (0x000000) to (0x00ffff) is to be converted, a region located on the proximal side from (0x00ffff), that is to say, a region exceeding (0x010000) cannot be converted. In general, the result of conversion for (0x010000) should be different from the result of conversion for (0x000000). Because (0x010000) has the central 8-bit value (0x00) as in (0x000000), however, the same result of conversion will be provided. For such a reason, the region where the Z-value exceeds (0x010000) cannot be converted. The proximal region that cannot be converted will be referred to "near region".

In FIGS. 18 to 21, furthermore, the frame buffer is denoted by FB, the Z butter being ZB and the work buffer being WB. In addition, Red, Green and Blue are sketched with R, G and B respectively while α-values A1, A2 and A3 are sketched with A. For example, Green in the frame buffer is sketched with FB:G.

FIG. 18 will be described below.

First of all, such a fog characteristic (Z-value/α-value characteristic) as shown by F2 in FIG. 12 is set in the lookup table (LUT) lut_0 (step S1). And, the procedure shifts to the processing in each frame (step S2). In addition, lut_0 designates a lookup table for implementing the conversion described in connection with FIG. 4.

In the processing of each frame, it is first judged whether a fog characteristic has been changed (step S3). If it has been changed, a new fog characteristic is set in lut_0 (step S4).

Next, an object to be covered with a fog is drawn in FB:R, G, B (step S5). At the same time, a Z-value (depth value) is written in at ZB (Z buffer).

Next, based on the motion of the camera (virtual camera information) and the flow of wind, UV values used for virtual distances d0, d1 d2 and sprite SP0, SP1, SP2 are then determined (step S6). And, a nonuniformity value for near regions is overwritten on FB:A2 (step S7).

Figure 22:
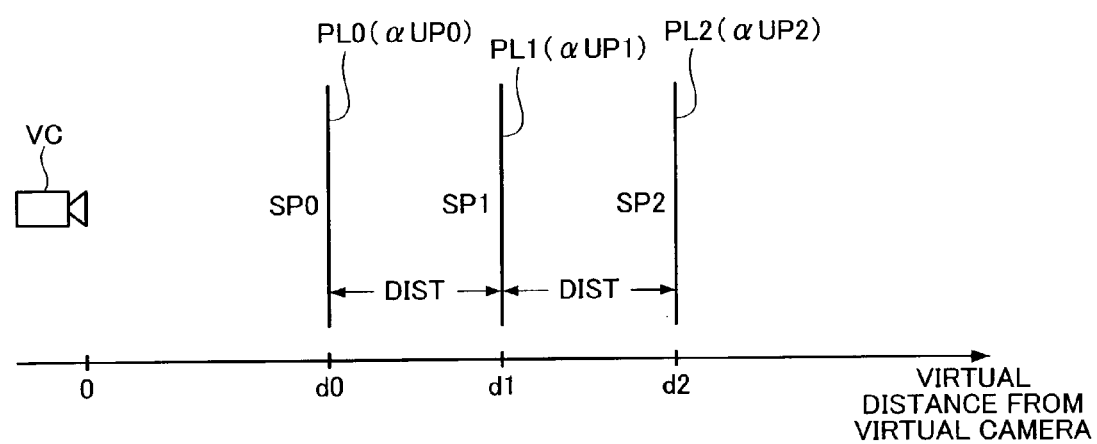
FIG. 22 is a diagram for illustrating a technique of setting a virtual distance.

For example, in this embodiment, virtual planes PL0 to PL2 (α-nonuniformity setting α-values αUP to αUP2) in which the virtual distances d0 to d2 from the virtual camera VC have been set are virtually arranged and the corresponding sprites SP0 to SP2 (which, in a broad sense, virtual objects) are arranged, as shown in FIG. 22.

The virtual planes PL0 to PL2 are virtually arranged such that they are located perpendicular to the optical axis of the virtual camera VC, as shown in FIG. 22. And, the virtual distances from the virtual camera VC to PL0 to PL2 are sequentially denoted by d0, d1 d2 as viewed from the proximal side to the virtual camera. The initial value of d0 is assumed DEPTH0. Moreover, the distance between adjacent virtual planes is assumed DIST (constant).

In other words, d0, d1 d2 are changed while keeping the following relationships.

$$d1=d0+\text{DIST} \quad (4)$$

$$d2=d1+\text{DIST} \quad (5)$$

In this embodiment, d0, d1 or d2 is changed depending on the motion of the virtual camera VC (virtual camera information) and the flow of wind. For example, d0 is reduced with the passage of time when the virtual camera moves forward or when the flow of wind is against the virtual camera.

Figure 23A:
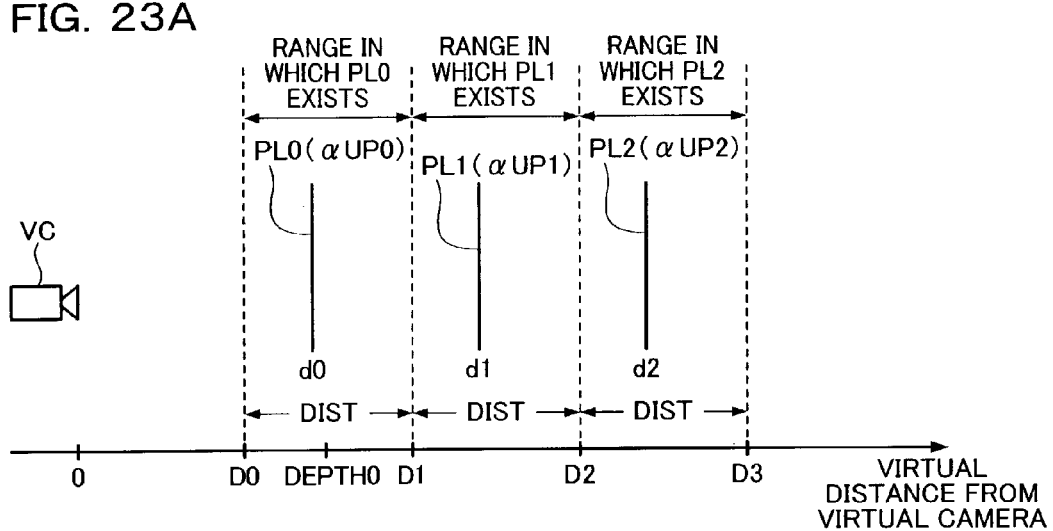
FIG. 23A is a diagram for illustrating a technique of restraining a range in which a virtual plane exists.

In order to replace each of the virtual planes PL0 to PL2 with another, the range in which each of the virtual planes exists is restricted by defining the respective one of constants D0, D1 and D2 as shown in FIG. 23A.

$$D0=\text{DEPTH0}-0.5\times\text{DIST} \quad (6)$$

$$D1=\text{DEPTH0}+0.5\times\text{DIST} \quad (7)$$

$$D2=\text{DEPTH0}+1.5\times\text{DIST} \quad (8)$$

$$D3=\text{DEPTH0}+2.5\times\text{DIST} \quad (9)$$

A technique of determining the virtual distances and UV values from the motion of the virtual camera and flow of wind (step S6 in FIG. 18) will be described below.

It is, however, assumed that each pixel on the screen is square and that an aspect ratio of the nonuniformity pattern texture is equal to that of the screen. Moreover, the meaning of symbols used herein is as follows.

T: Time of one frame (T=1/60 seconds at 60 frames/second)

tx, ty, tz: Distance through which the virtual camera moves during time T (in a camera coordinate system)

rx, ry, rz: Angle through which the virtual camera rotates during time T (in a camera coordinate system)

wx, wy, wz: Distance through which the wind flows during time T (in a camera coordinate system)

θz: Rotational angle of the virtual camera about its Z axis

TEXW: Width of nonuniformity pattern texture (number of pixels)

SCR_DEPTH: Distance from a virtual camera used for perspective conversion to a virtual screen;

SCRW: Width of a virtual screen used for perspective conversion

U0, V0: U- and V-values at a left upper corner in a sprite

U1, V1: U- and V-values at a right upper corner in a sprite

U2, V2: U- and V-values at a right lower corner in a sprite

U3, V3: U- and V-values at a left lower corner in a sprite

ASP: Aspect ratio of screen (vertical size/transverse size)

A value of d0 is determined as follows.

That is to say, a new value d0 is formed by adding (tz-wz) to the value of d0 previous by one frame. And, if d0<D0 or d0>D1, the virtual plane is replaced with another virtual plane with the value of d0 being also modified.

More particularly, if the value d0 is further reduced from a state of d0=D0 (or in a case wherein the virtual camera further moves forward), the replacement of virtual planes is carried out. That is to say, the role of PL1 is shifted into PL0 and the role of PL2 is put into PL1. And, the virtual distance of PL2 is newly set at d2=D3.

On the contrary, if the value d0 is further increased from a state of d0=D1 (i.e., d2=D3) (or in a case where the virtual camera moves backward), the reverse replacement of virtual plane is performed. And, the virtual distance of PL0 is newly set at d0=D0.

U- and V-values are determined as follows.

It is now assumed that the central coordinates of the region in a nonuniformity pattern texture which is mapped onto a sprite SP0 corresponding to the virtual plane PL0 are (cx, cy) and that the width of that region is w (the number of the pixels). Then, w is provided in the next expression:

$$w = TEXW \times (d0/DEPTH0) \tag{10}$$

Furthermore, new coordinates are provided by respectively adding dcx, dcy to the values cx, cy previous by one frame.

$$dcx = (tx - wx - d0 \times ry) \times SCD \times WSC \tag{11}$$

$$dcy = (-ty + wy - d0 \times rx) \times SCD \times WSC \tag{12}$$

Note that there is the relationship as follows.

$$SCD = SCR\_DEPYH/d0 \tag{13}$$

$$WSC = w/SCR\_W \tag{14}$$

Then, U- and V-values are obtained by following expressions:

$$U0 = cx - w \times \cos(\theta z)/2 - w \times \sin(\theta z) \times ASP/2 \tag{15}$$

$$U1 = cx + w \times \cos(\theta z)/2 - w \times \sin(\theta z) \times ASP/2 \tag{16}$$

$$U2 = cx + w \times \cos(\theta z)/2 + w \times \sin(\theta z) \times ASP/2 \tag{17}$$

$$U3 = cx - w \times \cos(\theta z)/2 + w \times \sin(\theta z) \times ASP/2 \tag{18}$$

$$V0 = cy - w \times \sin(\theta z)/2 - w \times \cos(\theta z) \times ASP/2 \tag{19}$$

$$V1 = cy - w \times \sin(\theta z)/2 - w \times \cos(\theta z) \times ASP/2 \tag{20}$$

$$V2 = cy - w \times \sin(\theta z)/2 + w \times \cos(\theta z) \times ASP/2 \tag{21}$$

$$V3 = cy + w \times \sin(\theta z)/2 + w \times \cos(\theta z) \times ASP/2 \tag{22}$$

However, instead of using the rotational angle of the virtual camera about the Z axis as $\theta z$, a new value $\theta z$ may be provided by giving a given initial value to $\theta z$ and also adding rx to $\theta z$ for every frame.

The description returns to FIG. 18.

After the step S7, a0 is determined based on the virtual distance d0 (step S8). And, a lookup table lut_a0 is created based on d0 and a0 (step S9).

Next, lut_a0 is then used to convert the value of ZB into an α-value which is in turn overwritten onto FB:A1 (step S10 see FIGS. 17A and 17B). And, a nonuniformity pattern is written into FB:A2 using the nonuniformity pattern texture and U- and V-values (for SP0) (step S11). At this time, the near region is masked and FB:A1 is used to perform the α-blending with the already written values.

In such a manner, a first plane for α-nonuniformity setting α-value (a nonuniformity pattern) is written into FB:A2.

Next, a1 is then determined based on the virtual distance d1 (step S12). And, a lookup table lut_a1 is created based on d1 a1 (step S13).

Next, lut_a1 is then used to convert the value of ZB into an α-value which is in turn overwritten onto FB:A1 (step S14) And, a nonuniformity pattern is written into FB:A2 using the nonuniformity pattern texture and U- and V-values (for SP1) (step S15). At this time, the near region is masked and FB:A1 is used to perform the α-blending with the already written values.

In this manner, the synthesized first and second planes for α-nonuniformity setting α-values (nonuniformity patterns) are written into FB:A2.

Next, a2 is determined based on the virtual distance d2 (step S16). And, a lookup table lut_a2 is created based on d2, a2 (step S17).

Next, lut_a2 is then used to convert the value of ZB into an α-value which is in turn overwritten onto FB:A1 (step S18) And, a nonuniformity pattern is written into FB:A2 using the nonuniformity pattern texture and U- and V-values (for SP2) (step S19). At this time, the near region is masked and FB:A1 is used to perform the α-blending with the already written values.

In this manner, the synthesized first, second and third planes for α-nonuniformity setting α-values (nonuniformity patterns) are written into FB:A2 (see FIG. 13).

Next, the value of FB:A2 is multiplied by an α-value for near region, clamped with 1.0 and overwritten onto FB:A3 (step S20).

Next, the lookup table lut_0 set in the step S1 or S4 of FIG. 18 is used to convert the value of ZB into an α-value. The value of FB:A2 is then multiplied by this α-value, clamped with 1.0 and written into FB:A3 (step S21). At this time, the near region is masked to perform the overwriting.

Thus, the conversion of Z-value into the α-value shown by C1 in FIG. 5 is implemented together with the synthesizing of α-values shown by C3.

Next, fog color objects each having a full screen size are then drawn in FB:R, G, B (step S22). At this time, FB:A3 is used to perform the α-blending with the already written values. Thus, the synthesizing of colors shown by C4 in FIG. 5 is implemented.

Finally, an object which does not want to be covered with a fog is overdrawn on FB:R, G, B (step S23).

However, the determination of a0, a1 and a2 in the steps S8, S12 and S16 shown in FIGS. 18 and 19 can be implemented as follows.

Figure 23B:
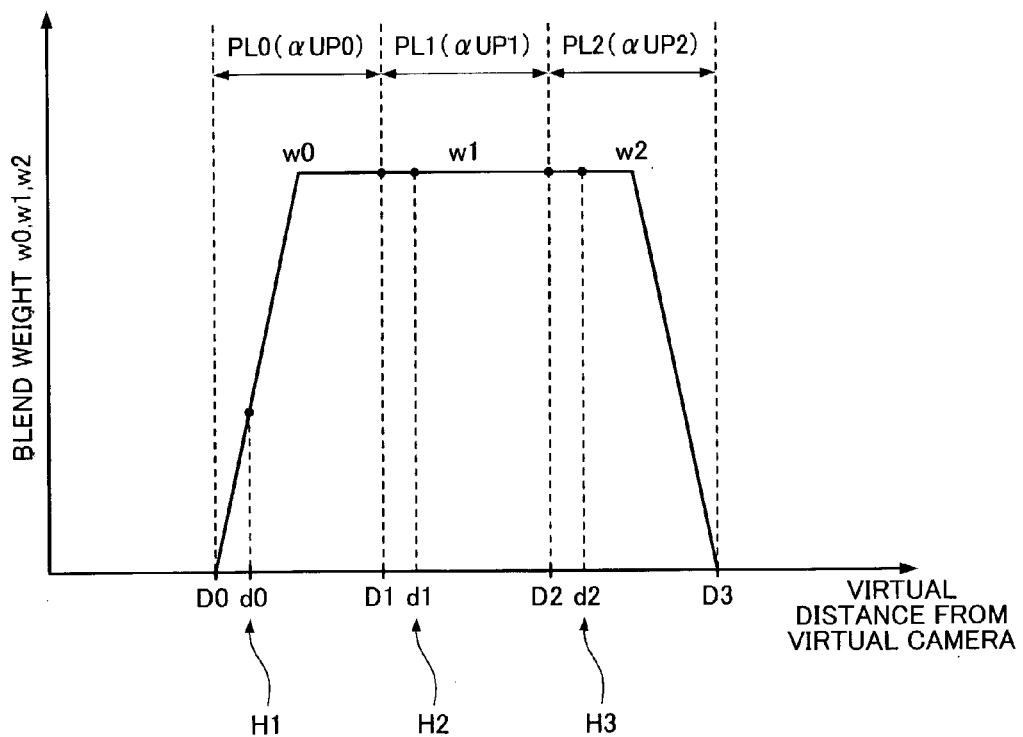
FIG. 23B is a diagram for illustrating setting of blend weight.

That is to say, if the blend weights of the virtual planes PL0, PL1 and PL2 are assumed w0, w1 and w2, these values w0, w1 and w2 will be set as shown in FIG. 23B.

That is to say, w1 is always made 1.

Moreover, w0 is made equal to 1 with d0≧D0+DIST/2. With d0<D0+DIST/2, w0 is reduced as d0 is reduced. At d0=D0, w0 is made equal to 0.

w2 is made equal to 1 with d2<D2+DIST/2. With d2>D2+DIST/2, w2 is reduced as d2 is increased. At d2=D3, w2 is made equal to zero.

If the α-values of the virtual planes PL0, PL2 and PL3 are a0, a1, a2, these values can be determined based on the blend weights w0 to w2.

$$a0 = w0/(1+w0) \tag{23}$$

$$a1 = w1/(1+w0+w1) \tag{24}$$

$$a2 = w1/(1+w0+w1+w2) \tag{25}$$

Figure 24A:
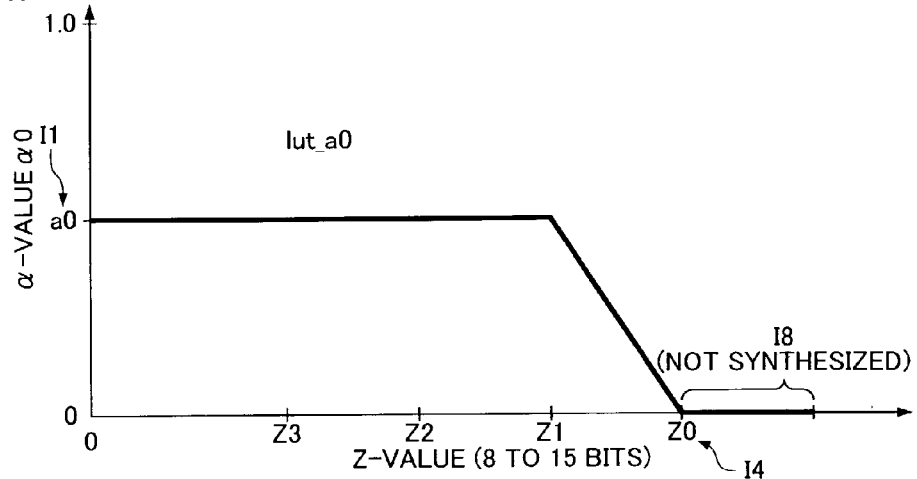
FIGS. 24A, 24B and 24C are graphs for illustrating the conversion characteristics of a lookup table.
Figure 24B:
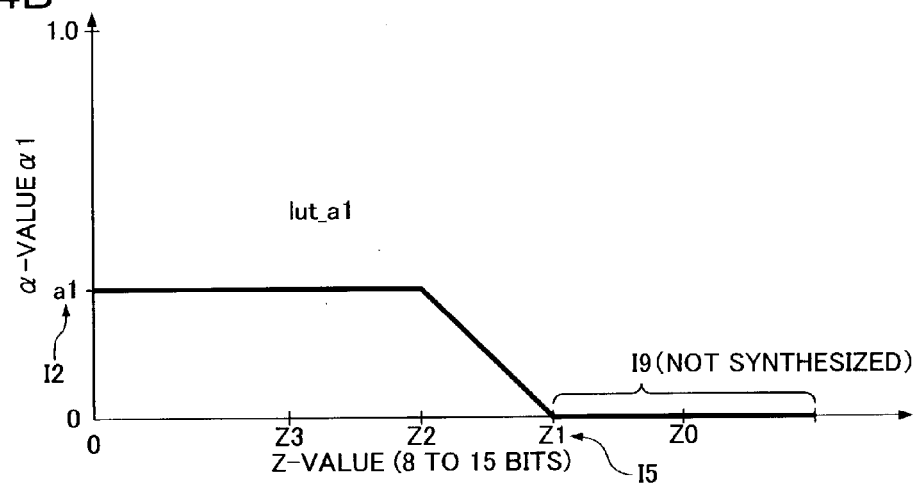
Figure 24C:
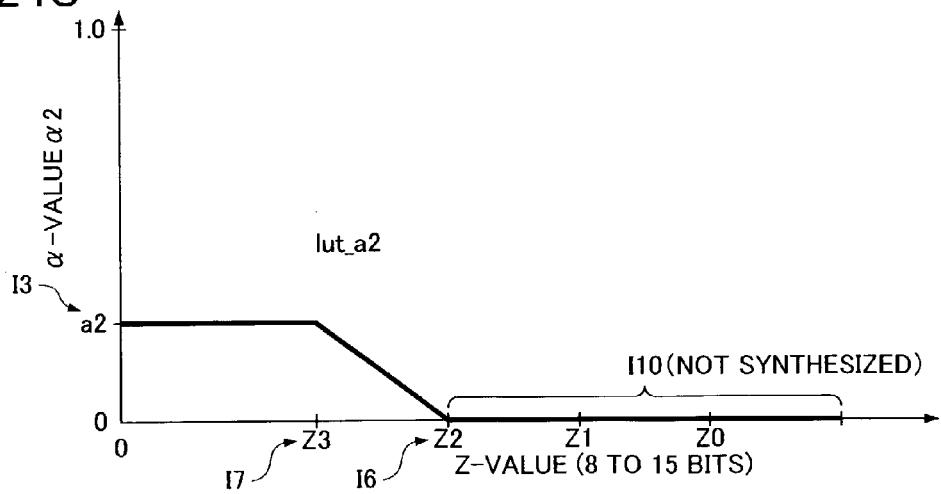

Moreover, the conversion characteristics (α-values of α0, α1 and α2) of the Look-up tables lut_a0, lut_a1 and lut_a2 created in the steps S9, S13 and S17 of FIGS. 18 and 19 are exemplified in FIGS. 24A, 24B and 24C.

In FIGS. 24A, 24B and 24C, Z0, Z1, Z2 and Z3 are virtual Z-values provided from the virtual distances d0, d1 and d2 of the virtual planes PL0, PL1 and PL2 as well as d2+DIST. More particularly, these values Z0, Z1, Z2 and Z3 can be provided based on inverse numbers of d0, d1, d2 and d2+DIST or the like. In addition, d0, d1 d2 and d2+DIST themselves may be set in Z0, Z1, Z2 and Z3, respectively.

a0, a1 and a2 of FIGS. 24A, 24B and 24C are respectively α-values of the virtual planes PL0, PL1 and PL2 determined in the steps S8, S12 and S16, respectively.

It is now assumed, for example, that the virtual distances d0, d1 and d2 of the virtual planes PL0, PL1 and PL2 are at positions H1, H2 and H3 in FIG. 23B, respectively. Then, blend weights w0, w1 and w2 at that time are determined based on this conversion characteristic of FIG. 23B.

If the determined blend weights w0, w1 and w2 are substituted for the above-mentioned expressions (23), (24) and (25), a0, a1 and a2 will be obtained. Thus, a0, a1 and a2 respectively shown by 11, 12 and 13 in FIGS. 24A, 24B and 24C are specified. Moreover, the virtual Z-values Z0, Z1, Z2 and Z3 shown by 14, 15, 16, 17 of FIGS. 24A, 24B, 24C are specified based on virtual distances d0, d1 d2 and d2+DIST, respectively. Thus, the conversion characteristics of 1Ut_a0, 1Ut_a1 and 1Ut_a2 are specified.

And, based on the conversion characteristics of FIGS. 24A, 24B and 24C, the Z-value of each pixel in the original image is converted into an α-value, with the resulting α-value being used to perform the blending of nonuniformity patterns (α-nonuniformity setting α-values).

Therefore, if the Z-value of that pixel in the original image is within such a range as shown by 18 in FIG. 24A, no synthesizing of αUP0 (PL0) for that pixel will be carried out. Similarly, if the Z-value of that pixel in the original image is within such a range as shown by 19, 110 of FIGS. 24B and 24C, no blending of αUP1 (PL1) and αUP2 (PL2) will be performed for that pixel. Thus, such a natural and realistic fog image as shown in FIGS. 9 and 10 can be generated.

Figure 20:
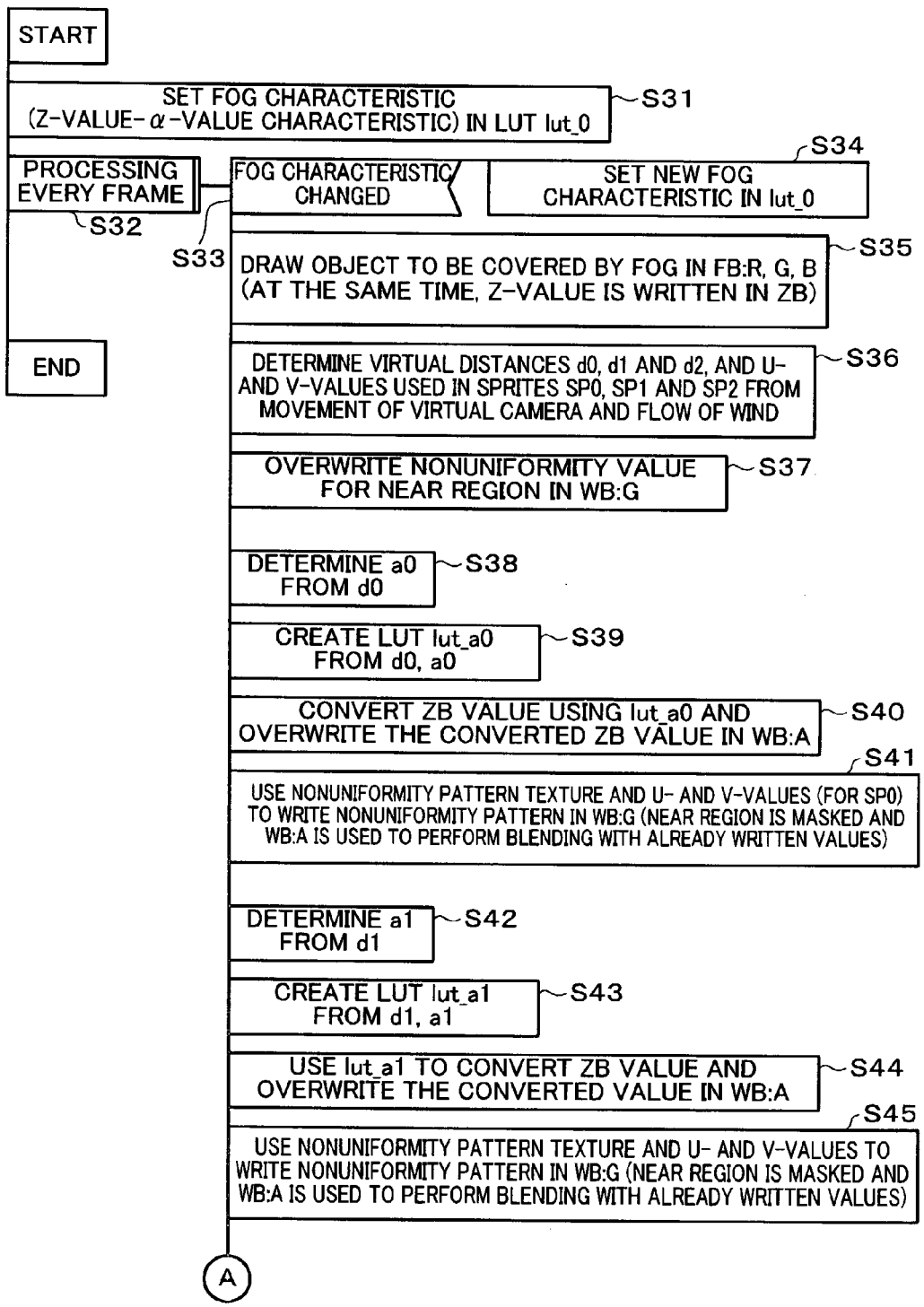
FIG. 20 is a PAD showing processing details in one embodiment of the present invention.
Figure 21:
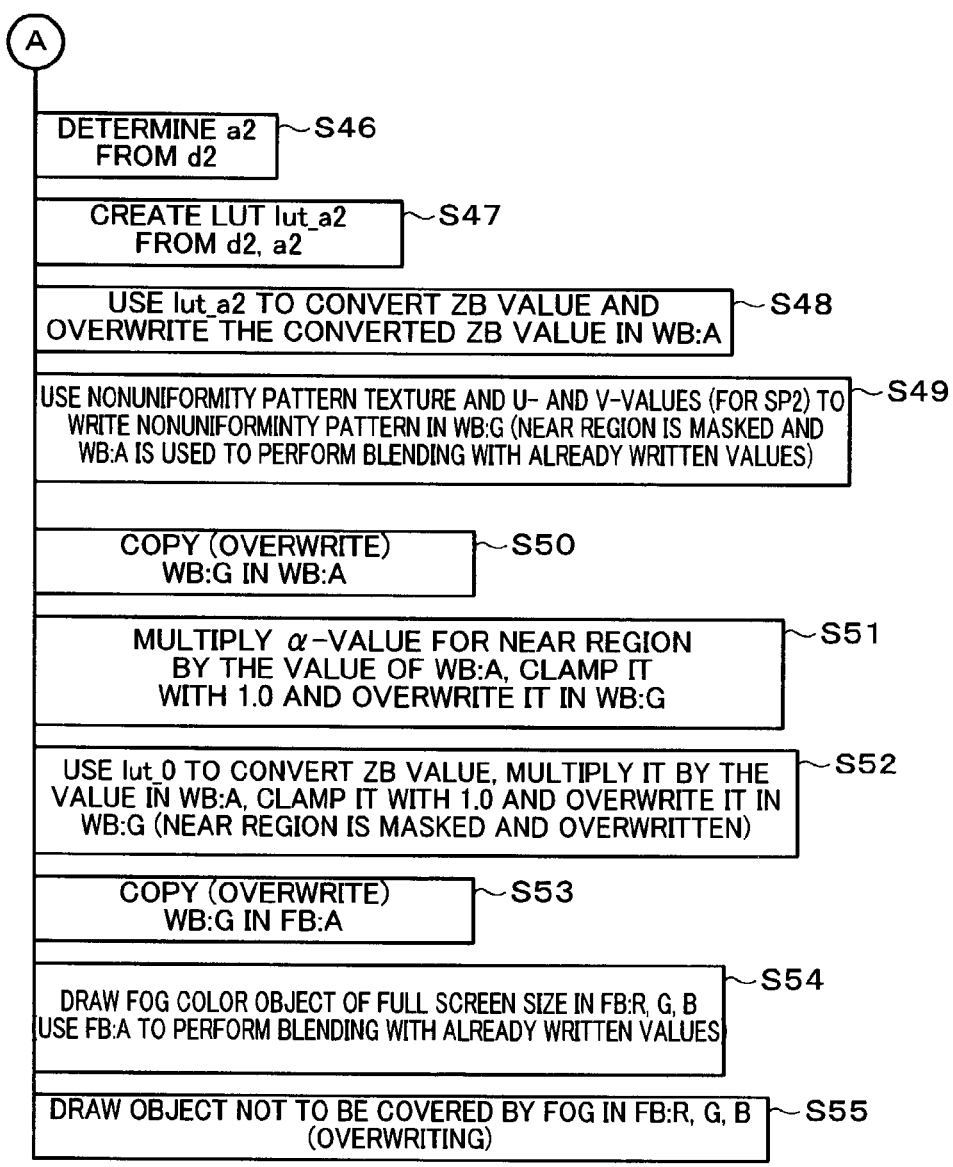
FIG. 21 is a PAD showing processing details in one embodiment of the present invention.

FIGS. 20 and 21 show PAD diagrams illustrating a process in a system in which each pixel in a frame buffer has only a single α-value.

The process of FIGS. 20 and 21 is different from that of FIGS. 18 and 19 only in the following points.

For example, at step S37 in FIG. 20, the nonuniformity value for near region is overwritten in a work buffer at WB:G.

Moreover, at steps S40, S44 and S48 in FIGS. 20 and 21, the lookup tables lut_a0, lut_a1 and lut_a2a are used to convert the value of ZB into an α-value which is in turn overwritten in the work buffer at WB:A.

In addition, at steps S41, S45 and S49, the nonuniformity pattern textures and U- and V-values (for SP0, SP1 and SP2) are used to overwrite the nonuniformity patterns at WB:G. And, at this time, the near region is masked and WB:A is used to perform the α-blending with the already written values.

And, at step S50 in FIG. 21, WB:G is copied in WB:A.

Next, at step S51, the value of WB:A is multiplied by an α-value for near region, clamped with 1.0 and overwritten in WB:G. And, at step S52, lut_0 is used to convert the value of ZB into an α-value which is in turn multiplied by the value of WB:A, clamped with 1.0 and written in WB:G. At this time, the near region is masked and overwritten.

Next, at step S53, WB:G is copied in FB:A. And, at step S54, a fog color object having a full screen size is drawn in FB:R, G, B. At this time, FB:A is used to perform the α-blending with the already written values.

Finally, at step S55, an object which does not want to be covered with a fog is drawn in FB:R, G, B.

In such a manner, even a system in which each pixel in a frame buffer can only have a single α-value can implement the process of this embodiment.

4. Hardware Configuration

Figure 25:
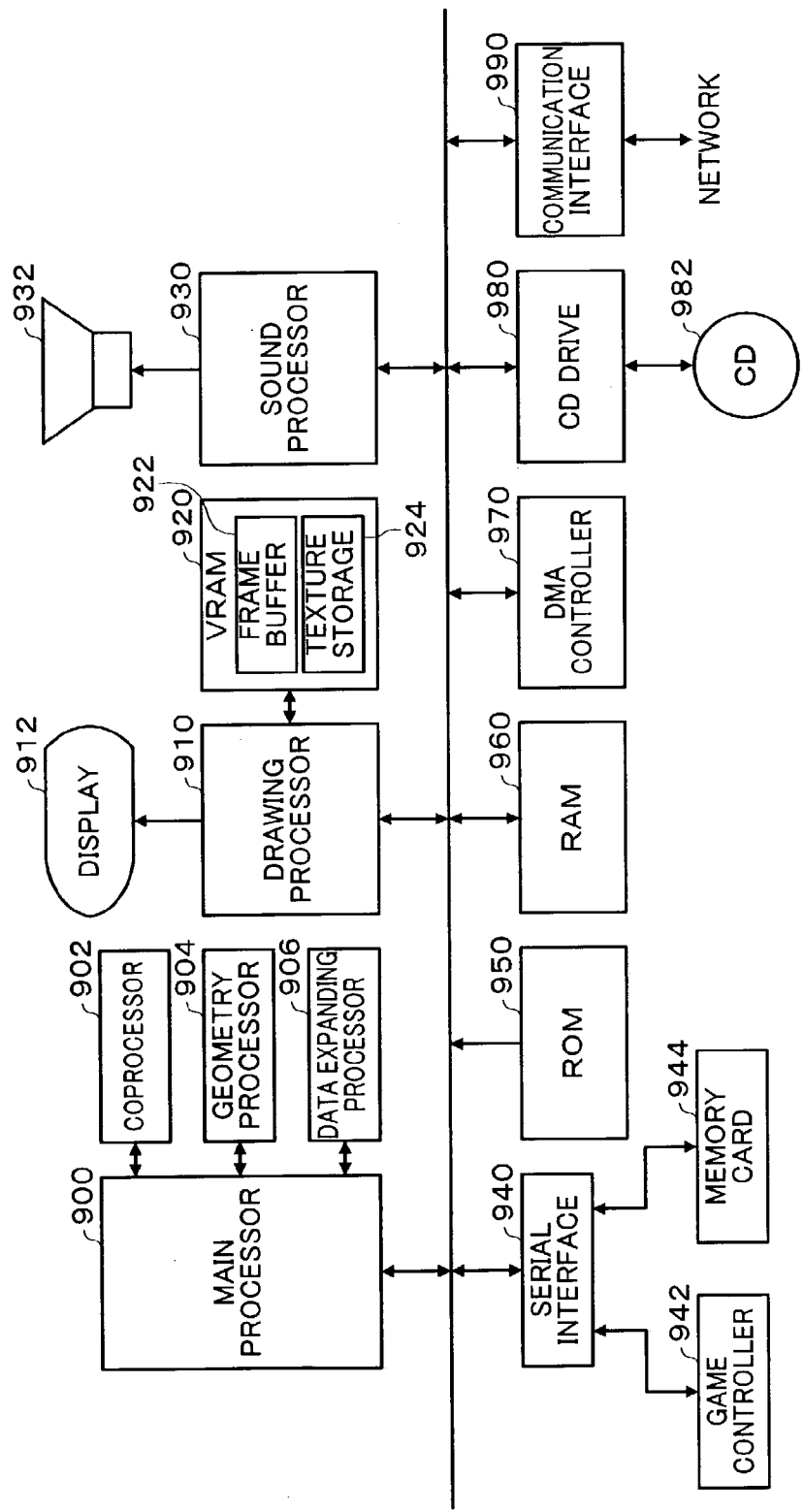
FIG. 25 shows an example of hardware configuration of one embodiment of the present invention.

Hardware configuration for implementing this embodiment will be described with reference to FIG. 25.

A main processor 900 operates to execute processing such as game processing, image processing, sound processing according to a program stored in a CD (information storage medium) 982, a program transferred through a communication interface 990 or a program stored in a ROM (one of the information storage media) 950.

A co-processor 902 is to assist the processing of the main processor 900 and has a product-sum operator and divider which can perform high-speed parallel calculation to execute a matrix (or vector) calculation at high speed. For example, if a physical simulation for causing an object to move or act (motion) requires the matrix calculation or the like, the program running on the main processor 900 instructs (or asks) that processing to the co-processor 902.

A geometry processor 904 is to perform a geometry processing such as coordinate conversion, perspective conversion, light source calculation, curve formation or the like and has a product-sum operator and divider which can perform high-speed parallel calculation to execute a matrix (or vector) calculation at high speed. For example, if the coordinate conversion, perspective conversion and light source calculation are to be performed, the program running on the main processor 900 instructs that processing to the geometry processor 904.

A data expanding processor 906 is to perform a decoding process for expanding image and sound compressed data or a process for accelerating the decoding process in the main processor 900. Thus, in the opening, intermission, ending or game scene, an MPEG compressed animation may be displayed. In addition, the image and sound data to be decoded may be stored in a ROM 950 or CD 982 or may externally be transferred through the communication interface 990.

A drawing processor 910 is to draw or render an object constructed by primitives (primitive faces) such as polygons or curved surfaces at high speed. On drawing of an object, the main processor 900 uses the function of a DMA controller 970 to deliver the object data to the drawing processor 910 and at the same time, transfers the texture to a texture storage section 924, if necessary. Then, the drawing processor 910 draws the object in a frame buffer 922 at high speed while performing the hidden-surface removal by the use of a Z buffer or the like, based on these object data and texture. The drawing processor 910 can also perform α-blending (or translucency processing), depth cueing, mip mapping, fog effects, bilinear filtering, trilinear filtering, anti-aliasing, shading and so on. And, as the image for one frame has been written into at the frame buffer 922, that image is then displayed on a display 912.

A sound processor 930 includes a multi-channel ADPCM sound source or the like for generating high-quality game sounds such as BGMs, effect sounds, voices and the like. The generated game sounds are then output through a speaker 932.

Operation data from a game controller 942 (including a lever, a button, a housing, a pad type controller or a gun type controller), save data from a memory card 944 and personal data are provided through a serial interface 940.

ROM 950 has stored a system program and so on. In arcade game systems, however, ROM 950 functions as an information storage medium for storing various programs. However, a hard disk may be used instead of the ROM 950.

RAM 960 is used as a working area for various processors.

DMA controller 970 controls DMA transfer between the processors and the memories (RAM, VRAM, ROM and the like).

CD drive 980 drives the CD (or information storage medium) 982 stored programs, image data or sound data to enable access to these programs and data.

The communication interface 990 is one for performing data transfer between the game system and any external instrument through a network. In this case, a network connecting to the communication interface 990 may include a telecommunication line (such as analog telephone line or ISDN) and a high-speed serial bus. And, data transfer can be carried out through Internet by using the telecommunication line. In addition, the data transfer between the present image generation system and any other image generation systems can be carried out when the high-speed serial bus is used.

All the sections or portions (means) of this embodiment may be executed only through hardware or only through a program which has been stored in an information storage medium or which is distributed through the communication interface. Alternatively, they may be executed through both the hardware and program.

If the sections of this embodiment are to be implemented through both the hardware and program, the information storage medium stores a program for causing the hardware (or computer) to function as the respective sections in this embodiment. More particularly, the aforementioned program instructs the processings to the processors 902, 904, 906, 910, 930 and so on, all of which are hardware, and delivers the data to them, if necessary. And, each of the processors 902, 904, 906, 910, 930 and so on will implement the corresponding one of the functional sections and/or portions of the present invention, based on the instructions and delivered data.

Figure 26A:
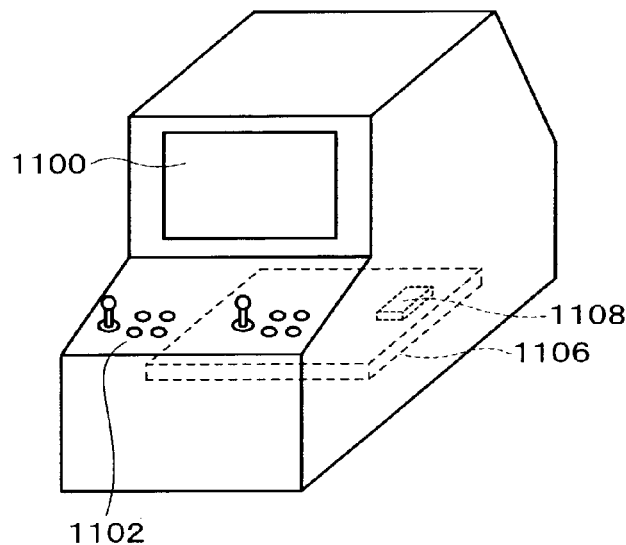
FIGS. 26A, 26B and 26C show various system forms to which embodiments of the present invention are applied.

FIG. 26A shows an arcade game system (or image generation system) to which this embodiment is applied. Players enjoy a game by operating a operating section 1102 (including levers and buttons) while viewing a game scene displayed on a display 1100. A system board (or circuit board) 1106 included in the game system includes various processors and memories which are mounted thereon. The program (data) for implementing all the sections or portions of this embodiment has been stored in a memory 1108 which is an information storage medium on the system board 1106. This program will be referred to "stored program (or stored information)".

Figure 26B:
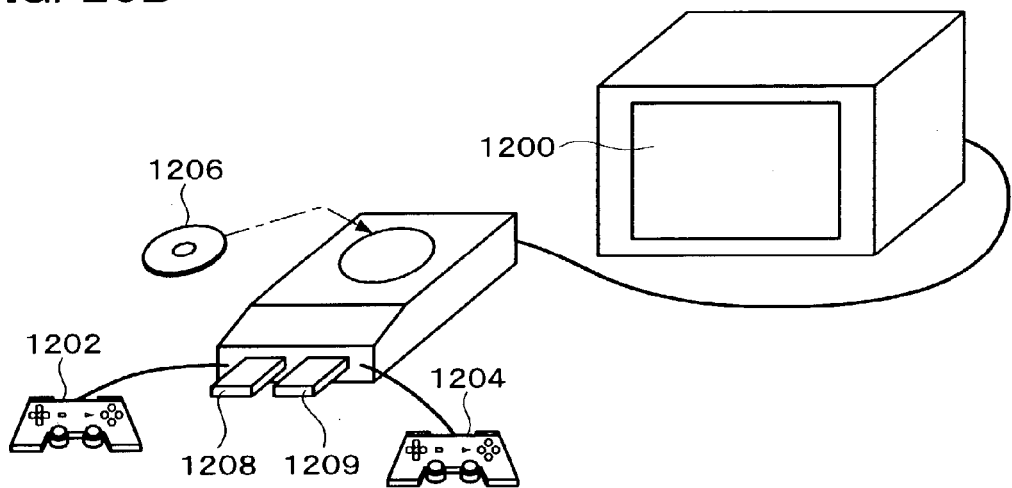

FIG. 26B shows a home game system (or image generation system) to which this embodiment is applied. Players enjoy a game by operating controllers 1202 and 1204 while viewing a game scene displayed on a display 1200. In this case, the aforementioned stored program (or stored information) has been stored in a CD 1206 which is a removable information storage medium on the main system or in memory cards 1208, 1209 and so on.

Figure 26C:
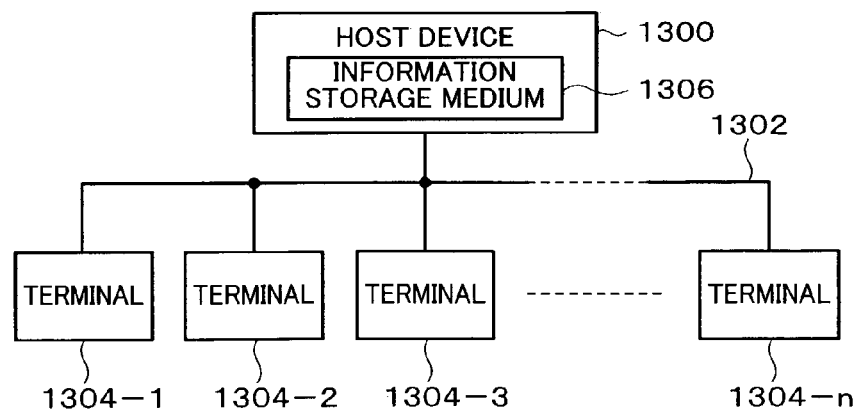

FIG. 26C shows an example wherein this embodiment is applied to a game system which includes a host device 1300 and terminals 1304-1 to 1304-n (game machines or portable telephones) connected to the host device 1300 through a network (which is a small-scale network such as LAN or a global network such as INTERNET) 1302. In this case, the aforementioned stored program (or stored information) has been stored, for example, in an information storage medium 1306 which can be controlled by the host device 1300, such as a magnetic disk unit, a magnetic tape unit or a memory. If each of the terminals 1304-1 to 1304-n can generate game images and sounds in the standalone manner, a game program and the like for generating game images and sounds will be delivered from the host device 1300 to that terminal. On the other hand, if each of the terminals cannot generate the game images and sounds in the standalone manner, the host device 1300 generates game images and sounds which are in turn transmitted to that terminal.

In the configuration of FIG. 26C, however, each part of this embodiment may dispersedly be implemented by the host device (or server) and terminals. Moreover, the aforementioned stored program (or stored information) for implementing the respective sections or portions of this embodiment may have been stored to distribute them into the information storage medium of the host device (or server) and the information storage media of the terminals.

Furthermore, each of the terminals connecting to the network may be either of a home game system or an arcade game system.

Note that the present invention is not limited to the above-described embodiment, and may be carried out in any one of various other forms.

For example, the terms such as sprite, fog nonuniformity and blending which are recited as broad terms (such as virtual object, a nonuniformity and synthesizing) in a certain portion of this specification description may be replaced by any other broad terms in the other portion of this specification.

The technique of synthesizing the α-values is not limited to the details of the technique described in connection with this embodiment, but can be implemented by any one of various other forms.

Although this embodiment has been described as to the synthesizing of α-nonuniformity setting α-values from α-values into which the Z-values of the original image are converted, the synthesizing of α-nonuniformity setting α-values is not limited to this.

Although this embodiment has been described as to the synthesizing of the colors of the original image and fog in which the second α-value provided by synthesizing the first α-value with the α-nonuniformity setting α-value is used. However, the second α-value may be used for an image generation different from such a synthesizing process.

Figure 27:
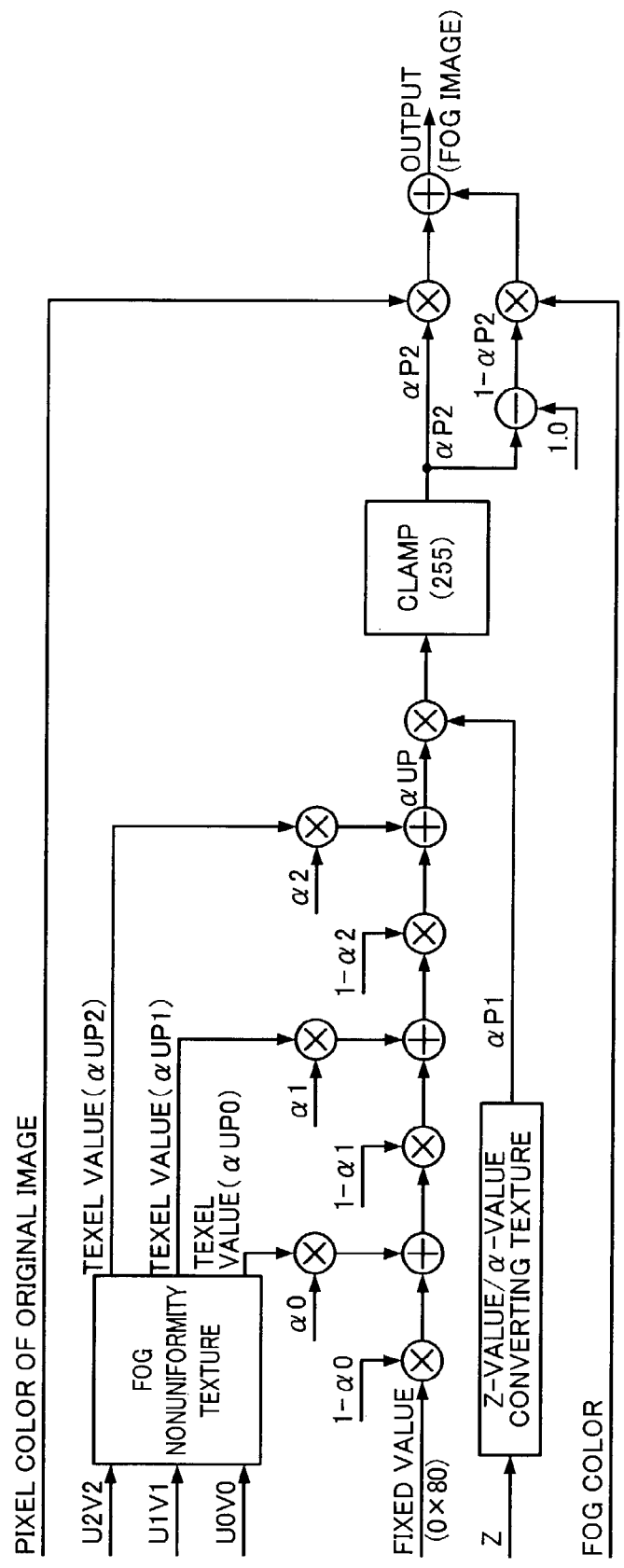
FIG. 27 is a diagram for illustrating a technique of synthesizing α-values and colors by a pixel unit.

Furthermore, the synthesizing of α-values and colors may be carried out by a plane unit or by a pixel unit. For example, FIG. 27 shows an example in which the synthesizing operation of α-values and colors is performed by a pixel unit. In FIG. 27, α0, α1 and α2 are α-values shown in FIGS. 24A, 24B and 24C (that is, α-values used to synthesize α-nonuniformity setting α-values). By using these values α0, α1 and α2 to synthesize αUP0, αUP1 and αUP2 which are texel values of the fog nonuniformity texture (see FIG. 8), the α-nonuniformity setting α-value αUP can be provided. And, the second α-value αP2 can be provided by synthesizing this αUP with the first α-value αP1 provided based on the Z-value and performing the clamping process. And, by using this αP2, the color of the original image is synthesized with the color of the fog to generate a fog image. FIG. 27 shows a final fog image which is drawn in the frame buffer by performing the synthesizing of such α-values with the colors by a pixel unit.

The invention defined in any one of the dependent claims may not include part of the elements defined in any independent claim on which it depends. Moreover, the primary component(s) of the invention defined in one independent claim may be included in the other independent claim.

The present invention can be applied to various games (such as fighting games, competition games, shooting games, robot fighting games, sports games and role playing games).

The present invention can be applied to various image generation systems (or game systems) such as arcade game systems, home game systems, large-scale attraction system in which a number of players play a game, simulators, multimedia terminals, system boards for generating game images and so on.

What is claimed is:

1. An image generation system which generates an image visible from a virtual camera in an object space, the image generation system comprising:

an alpha-value synthesis section which synthesizes a first alpha value and an alpha-nonuniformity setting alpha-value into a second alpha value, the first alpha value corresponding to a Z-value of each pixel in an original image, and the alpha-nonuniformity setting alpha-value of each pixel being nonuniform in an X-Y plane; and a color synthesis section which synthesizes a color of each pixel in the original image and a given color, based on the second alpha value, wherein the alpha-value synthesis section synthesizes a plurality of alpha-nonuniformity setting alpha-values provided for a plurality of X-Y planes into the alpha-nonuniformity setting alpha-value to be synthesized with the first alpha value, the plurality of alpha-nonuniformity setting alpha-values being different in the nonuniformity pattern;

wherein the alpha-value synthesis section reduces a synthesis rate of an alpha-nonuniformity setting alpha-value for the nearest X-Y plane among the plurality of X-Y planes when a virtual distance from the virtual camera to the nearest X-Y plane is shorter than a given distance;

wherein the alpha-value synthesis section reduces a synthesis rate of an alpha-nonuniformity setting alpha-value for the farthest X-Y plane among the plurality of X-Y planes when a virtual distance from the virtual camera to the farthest X-Y plane is larger than a given distance; and wherein the image visible from the virtual camera in the object space is generated based on the color synthesized by the color synthesis section.

2. An image generation system which generates an image visible from a virtual camera in an object space, the image generation system comprising:

an alpha-value synthesis section which synthesizes a first alpha value and an alpha-nonuniformity setting alpha-value into a second alpha value, the first alpha value corresponding to a Z-value of each pixel in an original image, and the alpha-nonuniformity setting alpha-value of each pixel being nonuniform in an X-Y plane; and a color synthesis section which synthesizes a color of each pixel in the original image and a given color, based on the second alpha value, wherein the alpha-value synthesis section changes a nonuniformity pattern in the X-Y plane corresponding to the alpha-nonuniformity setting alpha-value, based on at least one of virtual camera information and time information;

wherein the alpha-value synthesis section enlarges a nonuniformity pattern of the alpha-nonuniformity setting alpha-value in the X-Y plane when a virtual distance from the virtual camera to the X-Y plane decreases; and wherein the image visible from the virtual camera in the object space is generated based on the color synthesized by the color synthesis section.

3. An image generation system which generates an image visible from a virtual camera in an object space, the image generation system comprising:

an alpha-value synthesis section which synthesizes a first alpha value and an alpha-nonuniformity setting alpha-value into a second alpha value, the first alpha value corresponding to a Z-value of each pixel in an original image, and the alpha-nonuniformity setting alpha-value of each pixel being nonuniform in an X-Y plane; and a color synthesis section which synthesizes a color of each pixel in the original image and a given color, based on the second alpha value, wherein the alpha-value synthesis section changes a nonuniformity pattern in the X-Y plane corresponding to the alpha-nonuniformity setting alpha-value, based on at least one of virtual camera information and time information;

wherein, when the virtual camera moves in a first direction which is parallel to a screen, the alpha-value synthesis section moves a nonuniformity pattern of the alpha-nonuniformity setting alpha-value in the X-Y plane in a second direction which is opposite to the first direction; and wherein the image visible from the virtual camera in the object space is generated based on the color synthesized by the color synthesis section.

4. An image generation system which generates an image visible from a virtual camera in an object space, the image generation system comprising:

an alpha-value synthesis section which synthesizes a first alpha value and an alpha-nonuniformity setting alpha-value into a second alpha value, the first alpha value corresponding to a Z-value of each pixel in an original image, and the alpha-nonuniformity setting alpha-value of each pixel being nonuniform in an X-Y plane; and a color synthesis section which synthesizes a color of each pixel in the original image and a given color, based on the second alpha value, wherein the alpha-value synthesis section changes a nonuniformity pattern in the X-Y plane corresponding to the alpha-nonuniformity setting alpha-value, based on at least one of virtual camera information and time information;

wherein the alpha-value synthesis section applies nonuniformity pattern texture mapping to a virtual object to generate the alpha-nonuniformity setting alpha-value, and changes texture coordinates of the virtual object depending on at least one of the virtual camera information and the time information; and wherein the image visible from the virtual camera in the object space is generated based on the color synthesized by the color synthesis section.

5. An image generation system which generates an image visible from a virtual camera in an object space, the image generation system comprising:

an alpha-value synthesis section which synthesizes a first alpha value and an alpha-nonuniformity setting alpha-value into a second alpha value, the first alpha value corresponding to a Z-value of each pixel in an original image, and the alpha-nonuniformity setting alpha-value of each pixel being nonuniform in an X-Y plane; and a color synthesis section which synthesizes a color of each pixel in the original image and a given color, based on the second alpha value, wherein the alpha-value synthesis section synthesizes a plurality of alpha-nonuniformity setting alpha-values provided for a plurality of X-Y planes into the alpha-nonuniformity setting alpha-value to be synthesized with the first alpha value, the plurality of alpha-nonuniformity setting alpha-values being different in the nonuniformity pattern;

wherein the alpha-value synthesis section sets an alpha-value used to synthesize the plurality of alpha-nonuniformity setting alpha-values, based on a Z-value of each pixel in the original image;

wherein, when comparison of Z-values of pixels in the original image and a virtual Z-value of an X-Y plane corresponding to the alpha-nonuniformity setting alpha-value to be synthesized with the first alpha value indicates that the pixels in the original image are nearer to the virtual camera than the X-Y plane, the alpha-value synthesis section sets an alpha value used to synthesize the plurality of alpha-nonuniformity setting alpha-values into an alpha value which invalidates synthesis of the alpha-nonuninformity setting alpha-values; and wherein the image visible from the virtual camera in the object space is generated based on the color synthesized by the color synthesis section.

6. A computer readable storage medium storing a program which generates an image visible from a given viewpoint in an object space, the program causing a computer to function as:

an alpha-value synthesis section which synthesizes a first alpha value and an alpha-nonuniformity setting alpha-value into a second alpha value, the first alpha value corresponding to a Z-value of each pixel in an original image, and the alpha-nonuniformity setting alpha-value of each pixel being nonuniform in an X-Y plane; and a color synthesis section which synthesizes a color of each pixel in the original image and a given color, based on the second alpha value, wherein the alpha-value synthesis section synthesizes a plurality of alpha-nonuniformity setting alpha-values provided for a plurality of X-Y planes into the alpha-nonuniformity setting alpha-value to be synthesized with the first alpha value, the plurality of alpha-non-uniformity setting alpha-values being different in non-uniformity pattern; and wherein:

the alpha-value synthesis section reduces a synthesis rate of an alpha-nonuniformity setting alpha-value for the nearest X-Y plane among the plurality of X-Y planes when a virtual distance from the virtual camera to the nearest X-Y plane is shorter than a given distance; and the alpha-value synthesis section reduces a synthesis rate of an alpha-nonuniformity setting alpha-value for the farthest X-Y plane among the plurality of X-Y planes when a virtual distance from the virtual camera to the farthest X-Y plane is larger than a given distance.

7. A computer readable storage medium storing a program which generates an image visible from a given viewpoint in an object space, the program causing a computer to function as:

an alpha-value synthesis section which synthesizes a first alpha value and an alpha-nonuniformity setting alpha-value into a second alpha value, the first alpha value corresponding to a Z-value of each pixel in an original image, and the alpha-nonuniformity setting alpha-value of each pixel being nonuniform in an X-Y plane; and a color synthesis section which synthesizes a color of each pixel in the original image and a given color, based on the second alpha value, wherein the alpha-value synthesis section changes a non-uniformity pattern in the X-Y plane corresponding to the alpha-nonuniformity setting alpha-value, based on at least one of virtual camera information and time information; and wherein the alpha-value synthesis section enlarges a non-uniformity pattern of the alpha-nonuniformity setting alpha-value in the X-Y plane when a virtual distance from the virtual camera to the X-Y plane decreases.

8. A computer readable storage medium storing a program which generates an image visible from a given viewpoint in an object space, the program causing a computer to function as:

an alpha-value synthesis section which synthesizes a first alpha value and an alpha-nonuniformity setting alpha-value into a second alpha value, the first alpha value corresponding to a Z-value of each pixel in an original image, and the alpha-nonuniformity setting alpha-value of each pixel being nonuniform in an X-Y plane; and a color synthesis section which synthesizes a color of each pixel in the original image and a given color, based on the second alpha value, wherein the alpha-value synthesis section changes a non-uniformity pattern in the X-Y plane corresponding to the alpha-nonuniformity setting alpha-value, based on at least one of virtual camera information and time information; and wherein, when the virtual camera moves in a first direction which is parallel to a screen, the alpha-value synthesis section moves a nonuniformity pattern of the alpha-nonuniformity setting alpha-value in the X-Y plane in a second direction which is opposite to the first direction.

9. A computer readable storage medium storing a program which generates an image visible from a given viewpoint in an object space, the program causing a computer to function as:

an alpha-value synthesis section which synthesizes a first alpha value and an alpha-nonuniformity setting alpha-value into a second alpha value, the first alpha value corresponding to a Z-value of each pixel in an original image, and the alpha-nonuniformity setting alpha-value of each pixel being nonuniform in an X-Y plane; and a color synthesis section which synthesizes a color of each pixel in the original image and a given color, based on the second alpha value, wherein the alpha-value synthesis section changes a non-uniformity pattern in the X-Y plane corresponding to the alpha-nonuniformity setting alpha-value, based on at least one of virtual camera information and time information; and wherein the alpha-value synthesis section applies nonuniformity pattern texture mapping to a virtual object to generate the alpha-nonuniformity setting alpha-value, and changes texture coordinates of the virtual object depending on at least one of the virtual camera information and the time information.

10. A computer readable storage medium storing a program which generates an image visible from a given viewpoint in an object space, the program causing a computer to function as:

an alpha-value synthesis section which synthesizes a first alpha value and an alpha-nonuniformity setting alpha-value into a second alpha value, the first alpha value corresponding to a Z-value of each pixel in an original image, and the alpha-nonuniformity setting alpha-value of each pixel being nonuniform in an X-Y plane; and a color synthesis section which synthesizes a color of each pixel in the original image and a given color, based on the second alpha value, wherein the alpha-value synthesis section synthesizes a plurality of alpha-nonuniformity setting alpha-values provided for a plurality of X-Y planes into the alpha-nonuniformity setting alpha-value to be synthesized with the first alpha value, the plurality of alpha-non-uniformity setting alpha-values being different in non-uniformity pattern; and wherein the alpha-value synthesis section sets an alpha-value used to synthesize the plurality of alpha-nonuniformity setting alpha-values, based on a Z-value of each pixel in the original image; and wherein, when comparison of Z-values of pixels in the original image and a virtual Z-value of an X-Y plane corresponding to the alpha-nonuniformity setting alpha-value to be synthesized with the first alpha value indicates that the pixels in the original image are nearer to the virtual camera than the X-Y plane, the alpha-value synthesis section sets an alpha value used to synthesize the plurality of alpha-nonuniformity setting alpha-values into an alpha value which invalidates synthesis of the alpha-nonuninformity setting alpha-values.

\* \* \* \* \*